(12) United States Patent
Hou et al.

(10) Patent No.: US 11,909,688 B2
(45) Date of Patent: *Feb. 20, 2024

(54) APPARATUS AND METHOD IN WIRELESS COMMUNICATION SYSTEM, AND COMPUTER-READABLE STORAGE MEDIUM

(71) Applicant: Sony Group Corporation, Tokyo (JP)

(72) Inventors: Yanzhao Hou, Beijing (CN); Xiaofeng Tao, Beijing (CN); Yuming Liu, Beijing (CN); Xin Guo, Beijing (CN); Zhaoqi Peng, Beijing (CN); Min Zhu, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/841,664

(22) Filed: Jun. 16, 2022

(65) Prior Publication Data

US 2022/0385430 A1     Dec. 1, 2022

Related U.S. Application Data

(63) Continuation of application No. 16/648,243, filed as application No. PCT/CN2018/122012 on Dec. 19, 2018, now Pat. No. 11,394,509.

(30) Foreign Application Priority Data

Dec. 26, 2017  (CN) .......................... 201711433214.8

(51) Int. Cl.
*H04L 5/00* (2006.01)
*H04W 72/1263* (2023.01)
(Continued)

(52) U.S. Cl.
CPC .......... *H04L 5/0053* (2013.01); *H04L 5/0007* (2013.01); *H04W 72/1263* (2013.01); *H04W 72/23* (2023.01); *H04W 92/18* (2013.01)

(58) Field of Classification Search
CPC ................ H04L 5/0053; H04L 5/0007; H04L 27/26025; H04L 5/001; H04L 5/0091;
(Continued)

(56) References Cited

U.S. PATENT DOCUMENTS 10,834,704 B2   11/2020  Huang et al.
2017/0111930 A1  4/2017  Rajagopal et al.
(Continued)

FOREIGN PATENT DOCUMENTS

CN    106162513 A    11/2016
CN    106304351 A    1/2017
(Continued)

OTHER PUBLICATIONS

International Search Report and Written Opinion dated Mar. 19, 2019 for PCT/CN2018/122012 filed on Dec. 19, 2018, 10 pages.
(Continued)

*Primary Examiner* — Hardikkumar D Patel
(74) *Attorney, Agent, or Firm* — XSENSUS LLP

(57) ABSTRACT

An apparatus and method in a wireless communication system, and a computer-readable storage medium The method comprises: determining, based on at least one or more of resource set configuration information, physical channel information, and service type information, configuration information of one or more parameter sets for a sidelink communication; and controlling a base station to send the determined configuration information of the one or more parameter sets to a user equipment so that the user equipment performs sidelink communication on the basis of the one or more parameter sets, the parameter set comprising (Continued)

at least a subcarrier interval and a cyclic prefix type. The method can flexibly configure the parameter set used for the sidelink communication in NR so as to improve the communication performance of the sidelink communication and meet higher requirements on a series of indicators in an NR scene such as the delay and the system stability.

7 Claims, 20 Drawing Sheets

(51) Int. Cl.
  *H04W 72/23* (2023.01)
  *H04W 92/18* (2009.01)
(58) Field of Classification Search
  CPC ... H04L 27/2602; H04L 5/0028; H04L 27/26; H04W 72/1263; H04W 72/23; H04W 92/18; H04W 8/005; H04W 48/12; H04W 84/005; H04W 4/40; H04W 4/70; H04W 24/02; H04W 72/02; H04W 72/20; H04W 72/569
  See application file for complete search history.

(56) References Cited

U.S. PATENT DOCUMENTS

| | | |
|---|---|---|
| 2017/0289733 A1 | 10/2017 | Rajagopal et al. |
| 2018/0054804 A1* | 2/2018 | Luo ................. H04W 4/023 |
| 2019/0103931 A1* | 4/2019 | Yi ................. H04B 7/2656 |
| 2020/0235887 A1 | 7/2020 | Hou et al. |
| 2020/0322119 A1 | 10/2020 | Matsumura et al. |
| 2020/0358584 A1* | 11/2020 | Baldemair ............ H04L 5/0098 |

FOREIGN PATENT DOCUMENTS

| | | | |
|---|---|---|---|
| CN | 107040864 A | 8/2017 | |
| CN | 107113550 A | 8/2017 | |
| CN | 107295673 A | 10/2017 | |
| JP | 2017208587 A | 11/2017 | |
| WO | WO-2016068072 A1 | 5/2016 | |
| WO | 2016/126184 A1 | 8/2016 | |
| WO | 2017/156224 A1 | 9/2017 | |
| WO | 2017/179659 A1 | 10/2017 | |
| WO | 2017/195483 A1 | 11/2017 | |
| WO | 2017/196067 A1 | 11/2017 | |
| WO | 2017/204285 A1 | 11/2017 | |
| WO | WO-2018084796 A1 * | 5/2018 | ............... H04B 7/15 |

OTHER PUBLICATIONS

Extended European Search Report dated Jan. 20, 2021 in European Patent Application No. 18896924.0, 9 pages.

Intel Corporation, SS Burst Set Composition, 3GPP TSG RAN WG1 NR Ad-Hoc#2 R1-1710502, Jun. 17, 2017.

ITRI, Enhancement to sidelink physical layer structure in high speed scenarios for new radio, 3GPP TSG RAN WG1 #87 R1-1612202, Nov. 4, 2016.

* cited by examiner

APPARATUS AND METHOD IN WIRELESS COMMUNICATION SYSTEM, AND COMPUTER-READABLE STORAGE MEDIUM

CROSS-REFERENCE TO RELATED APPLICATIONS

The present application is a continuation of U.S. application Ser. No. 16/648,243, filed Mar. 18, 2020, which is based on PCT filing PCT/CN2018/122012, filed Dec. 19, 2018, which claims the priority to Chinese Patent Application No. 201711433214.8, filed Dec. 26, 2017 with the Chinese Patent Office, each of which is incorporated herein by reference in its entirety.

FIELD

The present disclosure generally relates to the technical field of wireless communications, and in particular to an apparatus and a method in a wireless communication system by which a numerology for sidelink communication in the New Radio (NR) technology is configured, and a computer readable storage medium.

BACKGROUND

In the conventional wireless communication technology, a numerology (including, for example, subcarrier spacing and a cyclic prefix type) used for sidelink communication is generally fixed, and a transmitting party and a receiving party perform the sidelink communication according to the fixed numerology. However, the fixed numerology is not applicable to the sidelink communication in the New Radio technology, which has higher requirements on a series of indicators such as delay and reliability.

SUMMARY

Brief summary of the present disclosure is given hereinafter, to provide basic understanding for certain aspects of the present disclosure. It should be understood that, the summary is not exhaustive summary of the present disclosure. The summary is not intended to determine key parts or important parts of the present disclosure, and is not intended to limit the scope of the present disclosure. An object of the summary is only to give some concepts of the present disclosure in a simplified form, as preamble of the detailed description later.

In view of the above, an object of at least one aspect of the present disclosure is to provide an apparatus and a method in a wireless communication system by which a numerology for sidelink communication can be configured, and a computer readable storage medium.

According to an aspect of the present disclosure, an apparatus in a wireless communication system is provided. The apparatus includes processing circuitry. The processing circuitry is configured to: determine, based on one or more of at least resource set configuration information, physical channel information and service type information, configuration information of one or more numerologies for sidelink communication; and control a base station to transmit the configuration information to user equipment for the user equipment to perform the sidelink communication based on the one or more numerologies, where a numerology comprises at least subcarrier spacing and a cyclic prefix type.

According to another aspect of the present disclosure, an apparatus in a wireless communication system is further provided. The apparatus includes processing circuitry. The processing circuitry is configured to: obtain one or more numerologies for sidelink communication; and control user equipment to perform the sidelink communication based on the one or more numerologies, where the one or more numerologies are determined based on configuration information from a base station or are pre-configured, and a numerology comprises at least subcarrier spacing and a cyclic prefix type.

According to another aspect of the present disclosure, a method in a wireless communication system is further provided. The method includes: determining, based on one or more of at least resource set configuration information, physical channel information and service type information, configuration information of one or more numerologies for sidelink communication; and controlling a base station to transmit the configuration information to user equipment for the user equipment to perform the sidelink communication based on the one or more numerologies, where a numerology comprises at least subcarrier spacing and a cyclic prefix type.

According to another aspect of the present disclosure, a method in a wireless communication system is further provided. The method includes: obtaining one or more numerologies for sidelink communication; and controlling user equipment to perform the sidelink communication based on the one or more numerologies, where the one or more numerologies are determined based on configuration information from a base station or are pre-configured, and a numerology comprises at least subcarrier spacing and a cyclic prefix type.

According to another aspect of the present disclosure, there is further provided a computer readable storage medium storing executable instructions which, when being executed by a computer, cause the computer to perform the method in a wireless communication system described above.

According to other aspects of the present disclosure, there are further provided computer program codes and computer program products for implementing the method provided in the present disclosure described above.

According to at least one aspect of the embodiments of the present disclosure, the used numerology is flexibly configured for the sidelink communication in the NR, thereby improving the communication performance of the sidelink communication, and meeting higher requirements for a series of indicators such as delay and system stability in the NR scenario.

Other aspects of the embodiments of the present disclosure are given in the following description, and the detailed description is intended to fully disclose preferred implementations of the embodiments of the present disclosure, but not to limit the present disclosure.

BRIEF DESCRIPTION OF THE DRAWINGS

The present disclosure can be understood better with reference to the description given in conjunction with the drawings in the following. The same or similar element is indicated by the same or similar reference numeral throughout all the drawings. The drawings are included in the description together with the following detailed illustration and form a part of the description, and are used to further illustrate preferred embodiments of the present disclosure and explain principles and advantages of the present disclosure by examples. In the drawings.

DETAILED DESCRIPTION OF EMBODIMENTS

Figure 1:
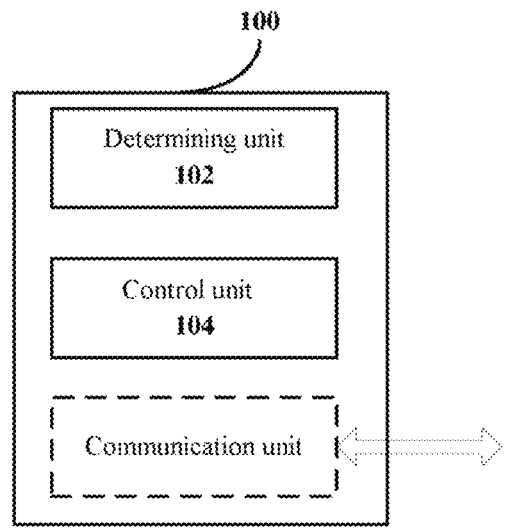
FIG. 1 is a block diagram showing a configuration example of an apparatus on a base station side in a wireless communication system according to an embodiment of the present disclosure.

Exemplary embodiments of the present disclosure are described below in conjunction with the drawings. For the sake of clarity and conciseness, not all the features of practical implementations are described in the specification. However, it should be appreciated that numerous implementation-specific decisions shall be made during developing any of such practical implementations so as to achieve the developer's specific goals, for example, to conform to constraints related to system and service, with these constraints varying with different implementations. In addition, it should further be understood that although the developing work may be very complicated and time-consuming, the developing work is only a routine task for those skilled in the art benefitting from the present disclosure.

It shall further be noted that only those apparatus structures and/or processing steps closely relevant to the solutions of the present disclosure are illustrated in the drawings while other details less relevant to the present disclosure are omitted so as not to obscure the present disclosure due to those unnecessary details.

Before describing the embodiments of the present disclosure in detail, it should be noted that "sidelink communication" mentioned herein generally refers to communication via a PC5 interface, and includes one or more of at least Vehicle to Everything (V2X) communication, Device to Device (D2D) communication, Machine Type Communication (MTC), Unmanned Aerial Vehicles (UAV) communication, and Carrier Aggregation (CA) communication. It should further be noted that the Vehicle to Everything (V2X) communication may include Vehicle to Vehicle (V2V) communication, Vehicle to Infrastructure (V2I) communication, Vehicle to Network (V2N) communication, Vehicle to Pedestrian (V2P) communication, and the like. Particularly, infrastructures in the V2I communication include not only a conventional base station, but also a Roadside Unit (RSU).

In addition, it should further be noted that, "a scenario of a base station performing resource scheduling" mentioned herein may correspond to a resource selection mode 3 in the V2X communication or a resource selection mode 1 in the D2D communication, and "a scenario of user equipment autonomously selecting resources" may correspond to a resource selection mode 4 in the V2X communication or a resource selection mode 2 in the D2D communication.

Embodiments of the present disclosure are described in detail below with reference to FIGS. 1 to 25. Hereinafter, the description is made in the following order. It should be noted that although the embodiments of the present disclosure are described in the following chapter order for the convenience of description, such chapter division and such chapter order are not intended to limit the present disclosure. In a process that the technology of the present disclosure is actually implemented, those skilled in the art may combine the following embodiments according to the principles and actual conditions of the present disclosure, unless the embodiments conflict with each other.

1. Configuration Example of Apparatus on Base Station Side in Present Disclosure
   1-1. Example in Scenario of User Equipment Autonomously Selecting Resources
   1-2. Example in Scenario of Base Station Performing Resource Scheduling
2. Configuration Example of Apparatus on User Equipment Side in Present Disclosure
   2-1. Example in Scenario of User Equipment Autonomously Selecting Resources
   2-2. Example in Scenario of Base Station Performing Resource Scheduling
   2-3. Example of Interacting Configuration Information of Numerology with Other Device
3. Example of Signaling Interaction Process Implementing Technology of Present Disclosure
   3-1. Example in Scenario of Base Station Performing Resource Scheduling
   3-2. Example in Scenario of User Equipment Autonomously Selecting Resources in Case of Being in Coverage of Base Station
   3-3. Example in Scenario of Being Outside Coverage of Base Station
4. Method Embodiment of Present Disclosure
5. Example of Application Scenario of Technology of Present Disclosure
   5-1. Example in NR V2V Scenario
   5-2. Example in NR V2X Platooning Scenario
   5-3. Example in NR Sidelink Carrier Aggregation Communication Scenario
   5-4. Example in NR D2D Scenario
   5-5. Example in NR Unmanned Aerial Vehicle Communication Scenario
   5-6. Example in NR V2I Scenario
6. Computing Device for Implementing Apparatus and Method Embodiments of Present Disclosure
7. Application Example of Technology of Present Disclosure
   7-1. Application Example on Base Station
   7-2. Application Example on User Equipment

1. Configuration Example of Apparatus on Base Station Side in Present Disclosure

1-1. Example in Scenario of User Equipment Autonomously Selecting Resources

FIG. 1 is a block diagram showing a configuration example of an apparatus on a base station side in a wireless communication system according to an embodiment of the present disclosure. This embodiment corresponds to a scenario (In-Coverage) in which user equipment is in a coverage of a base station.

As shown in FIG. 1, an apparatus 100 according to this embodiment may include a determining unit 102 and a control unit 104.

The determining unit 102 may be configured to determine, based on one or more of at least resource set configuration information, physical channel information and service type information, configuration information of one or more numerologies for sidelink communication.

The numerology herein refers to basic parameter configuration for transmission, and may include at least subcarrier spacing and a cyclic prefix type. Preferably, the numerology may further include one or more of the number of slots in a subframe, the number of Orthogonal Frequency Division Multiplexing (OFDM) symbols in a slot and the number of slots in a frame. In addition, the numerology may further include a series of transmission related parameters such as the number of OFDM symbols in the subframe and the number of OFDM symbols in the frame, which may be accordingly derived and are not listed herein.

It should be noted that configuration of parameters included in the numerology, such as the number of slots in a subframe, the number of OFDM symbols in a slot, and the number of slots in a frame, may be jointly determined by configuration of the subcarrier spacing and the cyclic prefix type. Therefore, the parameters included in a numerology actually have a one-to-one correspondence relationship with a certain combination of "subcarrier spacing and a cyclic prefix type". In other words, if given the subcarrier spacing and the cyclic prefix type in a numerology, other parameters in the numerology are determined accordingly. The subcarrier spacing may be expressed as $\Delta f = 2^\mu \cdot 15$ [kHz], where $\mu$ is an integer, and the cyclic prefix type may include a normal type and an extended type, so that the other parameters in the numerology may be expressed by the parameter $\mu$ and the cyclic prefix type. Therefore, in a process that the user equipment is configured with a numerology to be used, only indication information of the cyclic prefix type and the parameter $\mu$ may be notified to the user equipment, thereby reducing signaling overhead and communication load. The user equipment may accordingly obtain the transmission related parameters in the numerology based on a value of the parameter $\mu$ and the cyclic prefix type that are received by the user equipment. In the following description of a configuration example of the numerology, an example of a configurable numerology is given by giving an example of the value of the parameter $\mu$ for convenience of illustration.

The resource set configuration information may include, for example, configuration information of a resource pool (for example, division of the resource pool), configuration information of a carrier, configuration information of a Bandwidth Part (BWP), and other information that is related to transmission resource configuration. Different numerologies may be configured according to service contents carried by different resource set configurations.

The physical channel information may include at least, for example, information indicating a type of a physical channel. There are three types of physical channels in sidelink communication, i.e., a Physical Sidelink Control Channel (PSCCH), a Physical Sidelink Shared Channel (PSSCH), and a Physical Sidelink Broadcast Channel (PSBCH). Different numerologies may be configured according to factors such as frequency bands and modulation and demodulation manners respectively corresponding to different types of physical channels.

As an example but not limitation, in the NR sidelink communication, for the PBSCH, multiple numerologies respectively corresponding to values of $\mu$ being −2, −1, 0, 1, 2, 3 and 4 may be preferably selected, and multiple numerologies respectively corresponding to values of μ being −1, 0, 1 and 2 may be more preferably selected. Further, if only one numerology is selected, in order to maintain compatibility with conventional LTE services, the parameter μ may be preferably set to 0. For the PSCCH, multiple numerologies respectively corresponding to values of μ being 0, 1, 2 and 3 may be preferably selected, and multiple numerologies respectively corresponding to values of μ being 0 and 2 may be more preferably selected. Further, if only one numerology is selected, in order to maintain compatibility with the conventional LTE services, the parameter μ may be preferably set to 0. For the PSSCH, multiple numerologies respectively corresponding to values of μ being −5, −4, −3, −2, −1, 0, 1 and 2 may be preferably selected, and multiple numerologies respectively corresponding to values of μ being −3, −2, −1, 0, 1 and 2 may be more preferably selected. Further, if only one numerology is selected, in order to maintain compatibility with the conventional LTE services, the parameter μ may be preferably set to 0.

The service type information may include at least, for example, information indicating whether a service carried by the sidelink communication is an LTE service or an NR service. Different numerologies may be configured according to different requirements of the LTE service and the NR service on communication performance. For example, in a case that the service type information indicates the LTE service, a fixed numerology may be determined (for example, the subcarrier spacing is fixedly set to 15 kHz, that is, the parameter μ=0). In a case that the service type information indicates the NR service, multiple numerologies suitable for the current service may be determined further based on other factors. In this way, compatibility with the sidelink communication in the conventional LTE can be achieved. In addition, in a case that the service type information indicates that the LTE service and the NR service coexist, in order to ensure the compatibility, a numerology corresponding to the parameter μ=0 (that is, the subcarrier spacing is fixedly set to 15 kHz) may be configured.

It should be noted that, determining one or more numerologies based on one or more of the resource set configuration information, the physical channel information and the service type information is described above. However, in a case that the resource set configuration and the numerology configuration are associated with each other, the determination may be understood as establishing a correspondence between multiple numerologies and one or more of the resource set configuration information, the physical channel information and the service type information. In other words, in actual operation, one or more of the resource set configuration information, the physical channel information and the service type information may be determined based on the configured numerologies.

The control unit 104 may be configured to control the base station to transmit the determined configuration information of the one or more numerologies to the user equipment for the user equipment to perform the communication based on the one or more numerologies.

Preferably, the control unit 104 may be further configured to include the configuration information of the one or more numerologies in high layer signaling (for example, Radio Resource Control (RRC) layer signaling) to be transmitted to the user equipment. Further preferably, as described above, since the determining unit 102 may establish the correspondence between the resource set configuration information and the configuration information of the numerologies, the control unit 104 may control the base station to transmit the configuration information of the one or more numerologies in association with the resource set configuration information to the user equipment for subsequent resource selection and numerology selection. Alternatively, the resource set configuration information and the configuration information of the numerologies may be transmitted to the user equipment independently.

It should be noted that the one or more numerologies determined and notified to the user equipment herein are only used as candidate numerologies. Depending on whether a resource selection mode is that the base station performs resource scheduling or that the user equipment autonomously selects resources, the base station or the user equipment may select a specific numerology for the sidelink communication from the candidate numerologies.

The configuration example described with reference to FIG. 1 may correspond to a scenario where a user equipment autonomously selects resources, and an example in a scenario where a base station performs resource scheduling is described in detail below.

1-2. Example in Scenario of Base Station Performing Resource Scheduling

Figure 2:
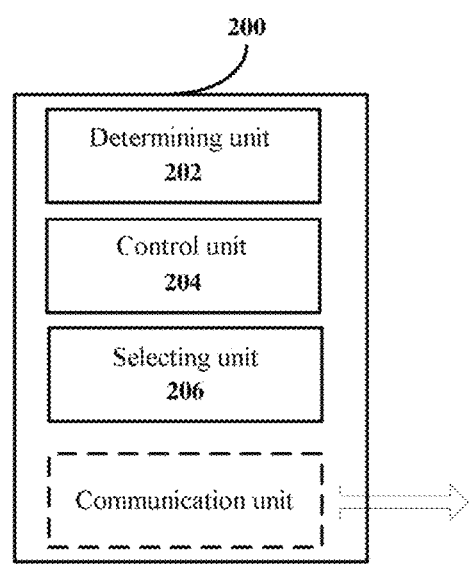
FIG. 2 is a block diagram showing another configuration example of an apparatus on a base station side in a wireless communication system according to an embodiment of the present disclosure.

FIG. 2 is a block diagram showing another configuration example of an apparatus on a base station side in a wireless communication system according to an embodiment of the present disclosure.

As shown in FIG. 2, an apparatus 200 according to this embodiment may include a determining unit 202, a control unit 204, and a selecting unit 206. A functional configuration example of the determining unit 202 is substantially the same as a functional configuration example of the determining unit 102 described above with reference to FIG. 1, which is not described herein again. Next, functional configuration examples of the control unit 204 and the selecting unit 206 are described in detail below.

Similar to the control unit 104 described above with reference to FIG. 1, the control unit 204 may control the base station to transmit the configuration information of the one or more numerologies determined by the determining unit 202 to the user equipment via, for example, the RRC signaling.

The selecting unit 206 may be configured to select, based on information related to one or more of at least a movement speed of the user equipment, a Channel Busy Ratio (CBR), a Channel Occupancy Ratio (CR) and a data service priority of the sidelink communication from the user equipment, a numerology for the sidelink communication from the one or more numerologies.

Specifically, in a V2X scenario where the user equipment may move at a high speed, a fast movement speed may cause a large change in channel conditions. In this case, the user equipment is required to report a movement speed (including an instantaneous movement speed and an average movement speed over a time period, and the like) of the user equipment to the base station for the base station to select a more suitable numerology for the sidelink communication. As an example, in the case of a fast speed, a numerology corresponding to a large parameter μ is selected.

As an example, a signaling interaction process in which the base station configures the user equipment to report the movement speed is briefly described with reference to FIG. 3, which is a flowchart showing an example of a signaling interaction process of a base station configuring user equipment to report a movement speed according to an embodiment of the present disclosure.

Figure 3:
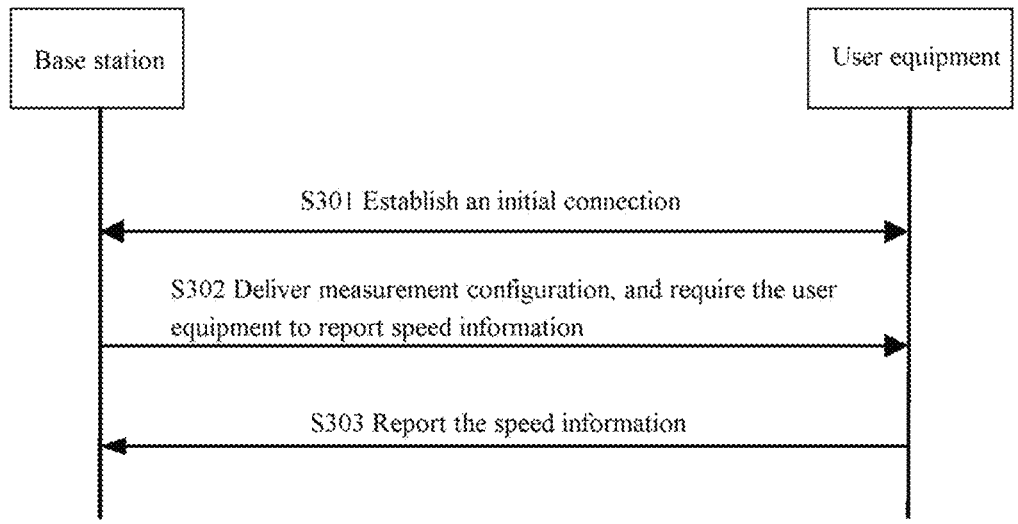
FIG. 3 is a flowchart showing an example of a signaling interaction process of a base station configuring user equipment to report a movement speed according to an embodiment of the present disclosure.

As shown in FIG. 3, in step S301, an initial connection (i.e., RRC_CONNECTED) is established between the base station and the user equipment. Next, in step S302, the base station may deliver measurement configuration to the user equipment, and require the user equipment to report speed information (including an instantaneous speed, an average speed, and the like) of the user equipment periodically or in response to an event trigger.

Next, in step S303, the user equipment may include the speed information in a measurement report to be reported to the base station periodically or in response to an event trigger according to the received measurement configuration.

Referring back to FIG. 2, according to the existing measurement configuration, the user equipment may report the measured channel busy ratio and/or channel occupancy ratio to the base station periodically or in response to an event trigger, for the base station to make related decisions. In this case, the selecting unit 206 on the base station side may further select an appropriate numerology based on the channel busy ratio and/or the channel occupancy ratio from the user equipment. As an example, in the case of a large channel busy ratio, that is, in the case of a busy channel, a numerology corresponding to a large parameter $\mu$ may be selected. In the case of a large channel occupancy ratio, that is, in the case of a high channel occupancy degree, a numerology corresponding to a large parameter $\mu$ may be selected. It should be noted that, periods in which the user equipment respectively reports the speed information, the channel busy ratio and the channel occupancy ratio may be the same as or different from each other, and trigger events for triggering the user equipment to respectively report the speed information, the channel busy ratio and the channel occupancy ratio may be the same as or different from each other, which is not limited in the present disclosure.

The data service priority of the sidelink communication refers to the priority of the data service to be transmitted through the sidelink communication. For example, the data service priority of the sidelink communication may be indicated by a ProSe Per-Packet Priority (PPPP), and may be included in a resource configuration request from the user equipment. As an example, in the case of a low data service priority of the sidelink communication, that is, in the case of a large PPPP, a numerology corresponding to a large parameter $\mu$ may be selected.

It should be noted that the selecting unit 206 may select a numerology to be used according to one or more of the above-mentioned four factors, and may determine which factor to be prioritized according to actual application scenarios. For example, in the V2X application scenario, the movement speed of the user equipment is taken as a main consideration, the second consideration is the channel busy ratio, the third consideration is the channel occupancy ratio, and the last consideration is the data service priority of the sidelink communication.

In addition, instead of or in combination with the above factors, the numerology to be used may be selected based on one or more of other factors, such as a type (for example, a vehicle, a pedestrian, a mobile relay, a relay node, a vehicle fleet member, and a vehicle fleet manager) of the user equipment, an information processing capability (whether to support carrier aggregation, a processing capability of a receiver, or the like) of the user equipment, a behavior of the user equipment, and beamforming related information. Particularly, in an unmanned aerial vehicle communication scenario, the following factors may be further taken into consideration, which include but are not limited to: a height of the user equipment, an altitude, a wind speed, an air pressure, a temperature and a humidity, a visibility, and the like. Those skilled in the art may determine factors to be considered when selecting a numerology to be used according to the principle of the present disclosure and specific application scenarios, which are not listed herein.

It should further be noted that the above-mentioned information related to one or more of at least the movement speed of the user equipment, the channel busy ratio, the channel occupancy ratio and the data service priority of the sidelink communication from the user equipment may be raw information obtained by the user equipment, or may also be information obtained after the raw information is pre-processed on the user equipment side. For example, the user equipment may determine a preferred numerology selection range based on one or more of the obtained movement speed, CBR, CR and PPPP, and report information indicating the numerology selection range to the base station. The base station may select the optimal numerology based on an actual network status in combination with the numerology selection range reported by the user equipment.

In addition, preferably, in a carrier aggregation (CA) communication scenario, the selecting unit 206 may be further configured to select a numerology to be used for each component carrier in the carrier aggregation communication. This is because that, in the CA scenario, different component carriers may correspond to different service types, and thus different numerology configurations are applicable. Selecting the corresponding numerology configuration according to a content transmitted by the component carrier and a characteristic thereof can effectively improve the efficiency of carrier aggregation transmission. The numerology configuration and selection for the carrier aggregation communication are described in detail in application scenario examples below.

The control unit 204 may be further configured to control the base station to transmit the numerology selected by the selecting unit 206 to the user equipment, for the user equipment to perform the sidelink communication based on the selected numerology.

Preferably, the control unit 204 may include information related to the selected numerology in physical layer signaling (specifically, for example, sidelink grant) to be transmitted to the user equipment. The user equipment may obtain the numerology by decoding the received physical layer signaling, and use the numerology for the sidelink communication. Preferably, the selected numerology may be transmitted to the user equipment via the sidelink grant in association with configuration information of resources allocated by the base station for the user equipment for the sidelink communication.

It should be noted that the apparatus on the base station side described above with reference to FIGS. 1 to 3 may be implemented at a chip level, or may also be implemented at a device level by including other external components. For example, the apparatus may operate as the base station, and includes a communication unit (which is optionally shown with a dashed box) configured to perform communication operation. The communication unit may include one or more communication interfaces, such as a PC5 interface, an X2 interface, an S1 interface, and a Uu interface, to support communication with different devices (for example, a vehicle in the V2I scenario, other base station, and a conventional user equipment). The implementation form of the communication unit is not specifically limited herein.

In addition, it should further be noted that functional units in the apparatus on the base station side described above are only logical modules divided according to specific functions of the functional units, and are not intended to limit the specific implementation. In actual implementation, the functional units and modules may be implemented as independent physical entities, or may be implemented by a single entity (for example, a processor (CPU or DSP, or the like), and an integrated circuit).

Corresponding to the configuration example on the base station side described above, a configuration example on the user equipment side in the wireless communication system according to the embodiment of the present disclosure is described below.

2. Configuration Example on User Equipment Side in Present Disclosure

Figure 4:
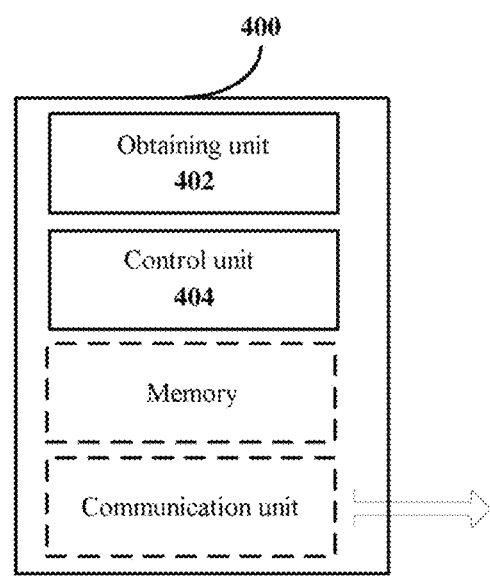
FIG. 4 is a block diagram showing a configuration example of an apparatus on a user equipment side in a wireless communication system according to an embodiment of the present disclosure.

FIG. 4 is a block diagram showing a configuration example of an apparatus on a user equipment side in a wireless communication system according to an embodiment of the present disclosure.

As shown in FIG. 4, an apparatus 400 according to this embodiment may include an obtaining unit 402 and a control unit 404.

The obtaining unit 402 may be configured to obtain one or more numerologies for sidelink communication. The one or more numerologies are determined based on configuration information from a base station or are pre-configured. A numerology includes at least subcarrier spacing and a cyclic prefix type.

Specifically, in a case that the user equipment is in a coverage of the base station, the base station may configure one or more numerologies for the user equipment in real time based on actual situations. The obtaining unit 402 on the user equipment side may obtain the one or more numerologies by decoding high layer signaling (for example, RRC layer signaling) including configuration information of the one or more numerologies that is received from the base station. A specific process of determining the one or more numerologies by the base station may refer to the above description of the embodiment on the base station side, which is not described herein again.

In addition, in a case that the user equipment is outside the coverage of the base station, the user equipment cannot receive the configuration information from the base station. In this case, the user equipment may obtain a stored default numerology or configuration information received last time from the base station as one or more pre-configured numerologies by reading, for example, an internal or external memory.

The control unit 404 may be configured to control the user equipment to perform sidelink communication based on the one or more obtained numerologies.

Corresponding to the above configuration example on the base station side, configuration examples on the user equipment side are respectively described below in detail for a scenario where the base station performs resource scheduling and a scenario where the user equipment autonomously selects resources.

2-1. Example in Scenario of User Equipment Autonomously Selecting Resources

Figure 5:
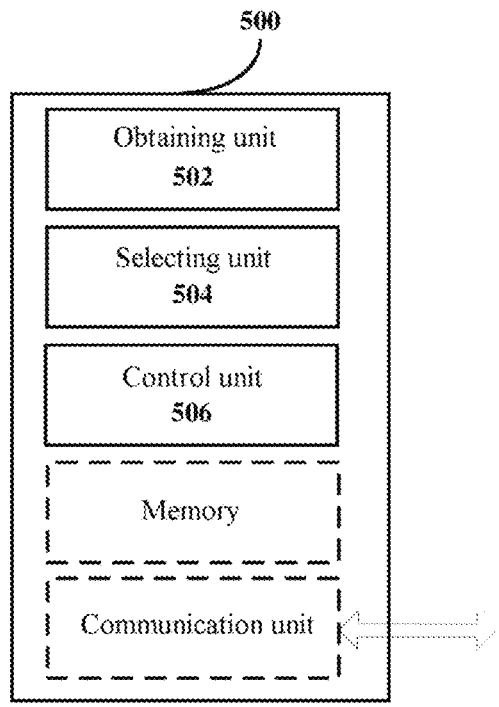
FIG. 5 is a block diagram showing another configuration example of an apparatus on a user equipment side in a wireless communication system according to an embodiment of the present disclosure.

FIG. 5 is a block diagram showing another configuration example of an apparatus on a user equipment side in a wireless communication system according to an embodiment of the present disclosure.

As shown in FIG. 5, an apparatus 500 according to this embodiment may include an obtaining unit 502, a selecting unit 504, and a control unit 506. A functional configuration example of the obtaining unit 502 is substantially the same as the functional configuration example of the obtaining unit 402 described above with reference to FIG. 4, which is not described herein again. Only functional configuration examples of the selecting unit 504 and the control unit 506 are described in detail below.

The selecting unit 504 may be configured to select, based on information related to one or more of at least a movement speed of the user equipment, a channel busy ratio, a channel occupancy ratio and a data service priority of the sidelink communication, a numerology for the sidelink communication from the one or more numerologies.

Preferably, the selecting unit 504 may further select the numerology to be used based on one or more of other factors, such as a height of the user equipment, a type (for example, a vehicle, a pedestrian, a mobile relay, a relay node, a vehicle fleet member, and a vehicle fleet manager) of the user equipment, an information processing capability (whether to support carrier aggregation, a processing capability of a receiver, or the like) of the user equipment, a behavior of the user equipment, and beamforming related information.

In addition, preferably, the selecting unit 504 may select the numerology for the sidelink communication from the one or more numerologies further based on information related to other device involved in the sidelink communication.

As an example, in a platooning scenario of the V2X communication, it is assumed that the user equipment is a vehicle fleet manager and knows basic information of other vehicle fleet members. In this case, in a process that the selecting unit 504 on the user equipment side as the vehicle fleet manager selects the numerology for the sidelink communication, information (for example, a movement speed, a type of a data service to be transmitted/received, a resource allocation situation, an information processing capacity) related to other vehicle fleet members may be considered in order to select an appropriate numerology. Alternatively, in the above embodiment in which the numerology selection is performed by the base station, the user equipment may collect and forward the above information related to other vehicle fleet members to the base station for the base station to perform the selection, which is not described in detail herein. The numerology selection in the platooning scenario is described in further detail in the following application scenario examples.

Particularly, in a case that the sidelink communication is carrier aggregation communication, the selecting unit 504 may further select the numerology for each component carrier in the carrier aggregation communication according to, for example, a content transmitted by the component carrier and a characteristic thereof, to improve the efficiency of carrier aggregation communication.

In addition, preferably, the selecting unit 504 may be further configured to: in a case that the one or more numerologies obtained by the obtaining unit 502 are pre-configured, select the numerology for the sidelink communication from the one or more numerologies further based on one or more of at least resource set configuration information, physical channel information and service type information.

Specifically, in a scenario where the user equipment is outside the coverage of the base station and cannot receive the real-time configuration information from the base station, the one or more numerologies obtained by the obtaining unit 502 are default configuration or the configuration previously received from the base station, without considering the current resource set configuration information, physical channel information, service type information, and the like. In this case, the selecting unit 504 may take one or more of the factors into consideration when selecting from the one or more pre-configured numerologies, to select the optimal numerology for the current sidelink communication.

It should be noted that the process of the selecting unit 504 on the user equipment side selecting the numerology for the sidelink communication from the one or more numerologies is substantially similar to the process of the selecting unit 206 on the base station side selecting the numerology described above with reference to FIG. 2, and the content that is not described in detail herein may refer to the description at the corresponding position above, which is not repeated herein.

The control unit 506 may be configured to control the user equipment to perform the sidelink communication based on the numerology selected by the selecting unit 504.

2-2. Example in Scenario of Base Station Performing Resource Scheduling

Figure 6:
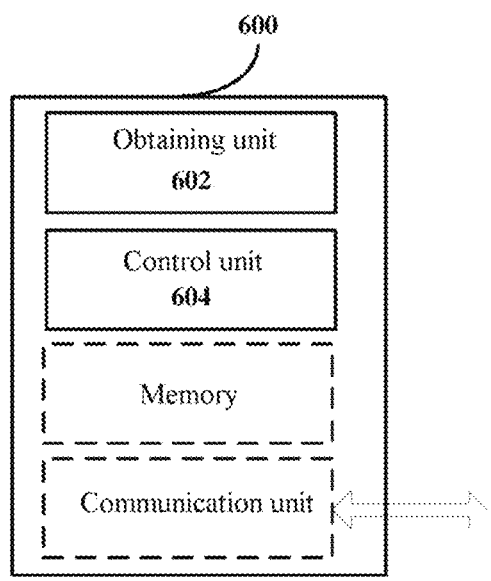
FIG. 6 is a block diagram showing another configuration example of an apparatus on a user equipment side in a wireless communication system according to an embodiment of the present disclosure.

FIG. 6 is a block diagram showing another configuration example of an apparatus on a user equipment side in a wireless communication system according to an embodiment of the present disclosure.

As shown in FIG. 6, an apparatus 600 according to this embodiment may include an obtaining unit 602 and a control unit 604. A functional configuration example of the obtaining unit 602 is substantially the same as the functional configuration example of the obtaining unit 402 described above with reference to FIG. 4, which is not described herein again. Only a functional configuration example of the control unit 604 is described in detail below.

The control unit 604 may be configured to control the user equipment to transmit information related to one or more of at least a movement speed of the user equipment, a channel busy ratio, a channel occupancy ratio and a data service priority of the sidelink communication to the base station, for the base station to select, based on the information, a numerology for the sidelink communication from the one or more numerologies.

Specifically, the control unit 604 may report, according to measurement configuration from the base station, one or more of speed related information (including an instantaneous speed, an average speed, and the like) of the user equipment, the measured channel busy ratio and channel occupancy ratio to the base station periodically or in response to an event trigger. One or more of the rates are reported to the base station. Reporting periods of the speed information, the channel busy ratio and the channel occupancy ratio may be the same as or different from each other, and reporting trigger events of the speed information, the channel busy ratio and the channel occupancy ratio may be the same as or different from each other, which is not limited herein.

In addition, the control unit 604 further obtains priority information (for example, PPPP) of a communication service to be transmitted, and may include the priority information in, for example, a resource configuration request to be reported to the base station. The base station may select an appropriate numerology based on one or more of the above factors according to actual application scenarios, to take into account both system stability and spectral efficiency.

The control unit 604 may control the user equipment to transmit raw information of one or more of the movement speed of the user equipment, the channel busy ratio, the channel occupancy ratio and the data service priority of the sidelink communication directly to the base station. Alternatively, the control unit 604 may pre-process the raw information to determine a preferred numerology selection range of the user equipment, and control the user equipment to transmit information indicating the numerology selection range to the base station as a numerology configuration request.

In addition to the above factors, the control unit 604 may further perform control to transmit other information related to the user equipment or other information obtained by the user equipment (including but not limited to capability information of the user equipment, the type information of the user equipment, the behavior of the user described above) to the base station, for the base station to select the optimal numerology by comprehensively considering for different application scenarios. Taking the platooning scenario in the V2X communication as an example, in a case that the numerology is selected by the base station side, the control unit 604 of the user equipment as the vehicle fleet manager may further transmit the basic information of other vehicle fleet members known and collected by the user equipment to the base station, for the base station to select the optimal numerology for the sidelink communication between the vehicle fleet members.

The obtaining unit 602 may obtain the numerology selected by the base station by decoding physical layer signaling (for example, sidelink grant) from the base station. The control unit 604 may control the user equipment to perform the sidelink communication based on the obtained numerology.

It should be noted that the configuration example of the apparatus on the user equipment side described here with reference to FIG. 6 corresponds to the configuration example on the base station side described above with reference to FIG. 2, and the content that is not described in detail herein may refer to the description at the corresponding position above, which is not repeated herein.

2-3. Example of Interacting Configuration Information of Numerology with Other Device FIG. 7 is a block diagram showing another configuration example of an apparatus on a user equipment side in a wireless communication system according to an embodiment of the present disclosure.

Figure 7:
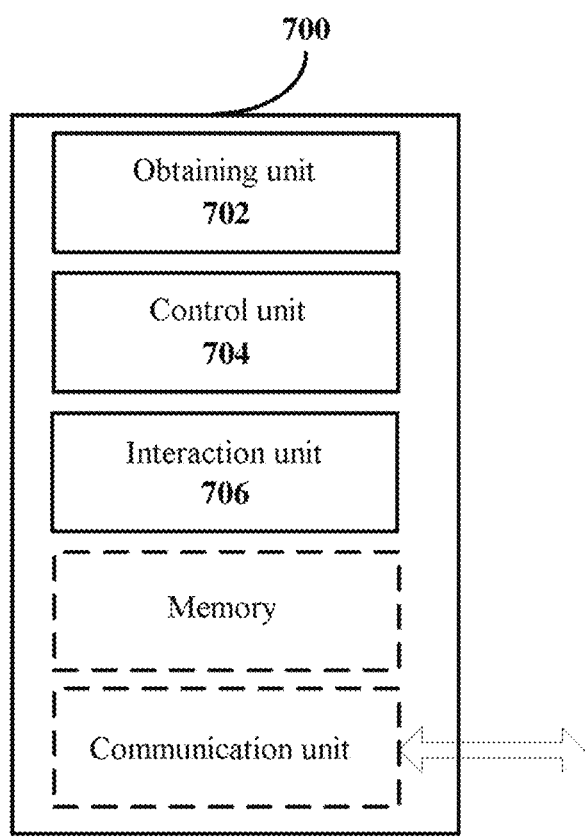
FIG. 7 is a block diagram showing another configuration example of an apparatus on a user equipment side in a wireless communication system according to an embodiment of the present disclosure.

As shown in FIG. 7, an apparatus 700 according to this embodiment may include an obtaining unit 702, a control unit 704, and an interaction unit 706. Depending on whether the resource selection is performed by the user equipment or the base station, the obtaining unit 702 and the control unit 704 described herein respectively have the substantially same functional configuration examples as the obtaining unit and the control unit included in the apparatus described above with reference to FIG. 5 or FIG. 6, which is not repeated herein. Only a functional configuration example of the interaction unit 706 is described in detail below.

The interaction unit 706 may be configured to control the user equipment to transmit the selected numerology to one or more other devices in sidelink communication with the user equipment.

Different from the case in the conventional technology that the transmitting party and the receiving party both perform sidelink communication based on a fixed numerology configuration, in the embodiment of the present disclosure, the numerology for the sidelink communication can be dynamically and flexibly configured, and the transmitting party notifies the selected numerology to other device involved in the sidelink communication, so that the transmitting and receiving parties can synchronize the numerology configuration used for the communication.

As an implementation example, the interaction unit 706 may include the selected numerology in Sidelink Control Information (SCI), and transmit the SCI to other device in a broadcast, unicast, and/or multicast manner. The other device receiving the SCI may obtain configuration information of the numerology by decoding signaling, and receive information from the transmitting user equipment based on the numerology.

Similarly, in a case that the user equipment where the apparatus 700 is located operates as a receiving device, the interaction unit 706 may obtain a numerology for sidelink communication of other device by decoding sidelink control information from the other device. The control unit 704 controls, based on the obtained numerology of the other device, the user equipment to receive information from the other device.

Figure 8:
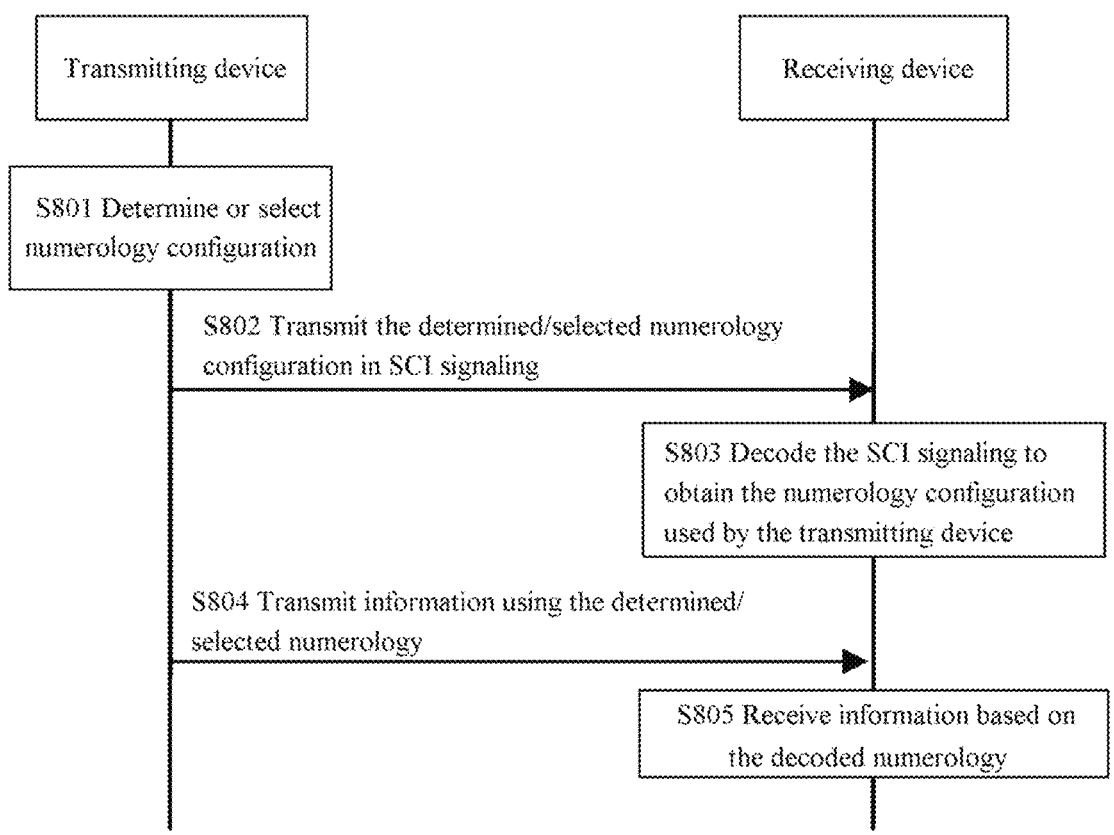
FIG. 8 is a flowchart showing an example of a signaling interaction process of transmitting and receiving parties synchronizing numerology configuration according to an embodiment of the present disclosure.

FIG. 8 is a flowchart showing an example of a signaling interaction process of transmitting and receiving parties synchronizing numerology configuration according to an embodiment of the present disclosure.

As shown in FIG. 8, in step S801, a transmitting device selects or determines a numerology to be used for sidelink communication. Specifically, the transmitting device may select the numerology by performing the selection process performed by the selecting unit 504 described above, or may also determine a numerology selected by a base station by decoding information from the base station.

Next, in step S802, the transmitting device includes the selected/determined numerology in SCI signaling to be transmitted to a receiving device. In step S803, the receiving device obtains configuration information of the numerology to be used by the transmitting device for information transmission by decoding the received SCI signaling. It should be noted that the numerology used by the transmitting device for transmitting the SCI signaling may be pre-configured by the transmitting and receiving parties, or may be randomly selected. Accordingly, the receiving device may receive the SCI signaling based on the pre-configured numerology or by blind detection.

Next, the transmitting device transmits information to the receiving device using the selected/determined numerology in step S804, and the receiving device receives information from the transmitting device based on the decoded configuration information of the numerology in step S805.

It should be noted that the signaling interaction process described with reference to FIG. 8 is only for explaining the numerology configuration synchronization process of the transmitting and receiving parties, and descriptions irrelevant to this process are omitted. In addition, it should further be noted that the synchronization process is described in a chronological order with reference to the flowchart shown in FIG. 8 for convenience of explanation, but the chronological order is not intended to limit the present disclosure.

It should further be noted that the apparatus on the user equipment side described above with reference to FIGS. 4 to 8 may be implemented at a chip level, or may also be implemented at a device level by including other external components. For example, the apparatus may operate as the user equipment, and includes a communication unit (optionally, which is shown with a dashed box) configured to perform communication operation. The communication unit may include one or more communication interfaces, such as a PC5 interface, a Uu interface, etc., to support communication with different devices (for example, a vehicle, an internet, and a base station). The implementation form of the communication unit is not specifically limited herein. Preferably, the apparatus may further include a memory (which is optionally shown by a dashed box) configured to store default resource set configuration and numerology configuration, resource set configuration and numerology configuration received last time from the base station, and the like.

In addition, it should further be noted that functional units in the apparatus on the user equipment side described above are only logical modules divided according to specific functions of the functional units, and are not intended to limit the specific implementation. In actual implementation, the functional units and modules may be implemented as independent physical entities, or may be implemented by a single entity (for example, a processor (CPU or DSP, or the like), and an integrated circuit).

It should further be noted that although the apparatus embodiments of the present disclosure are described above with reference to the block diagrams shown in the drawings, the apparatus embodiments are merely exemplary and non-limitative. Those skilled in the art may modify the shown functional configuration examples according to the principle of the present disclosure, for example, add, delete, modify, or combine the functional modules in the above embodiments, and all such modifications should be considered to fall within the scope of the present disclosure.

In addition, it should further be noted that although the configuration examples of the apparatus in various scenarios are separately described above for clarity of description, this does not mean that the embodiments are mutually exclusive. In actual implementation, the embodiments may be combined according to the principle of the present disclosure, and such a combination should be considered to fall within the scope of the present disclosure.

To facilitate a further understanding of the technology of the present disclosure, a signaling interaction process implementing the technology of the present disclosure is described below with reference to FIGS. 9 to 11.

3. Signaling Interaction Process Implementing Technology of Present Disclosure

3-1. Example in Scenario of Base Station Performing Resource Scheduling

Figure 9:
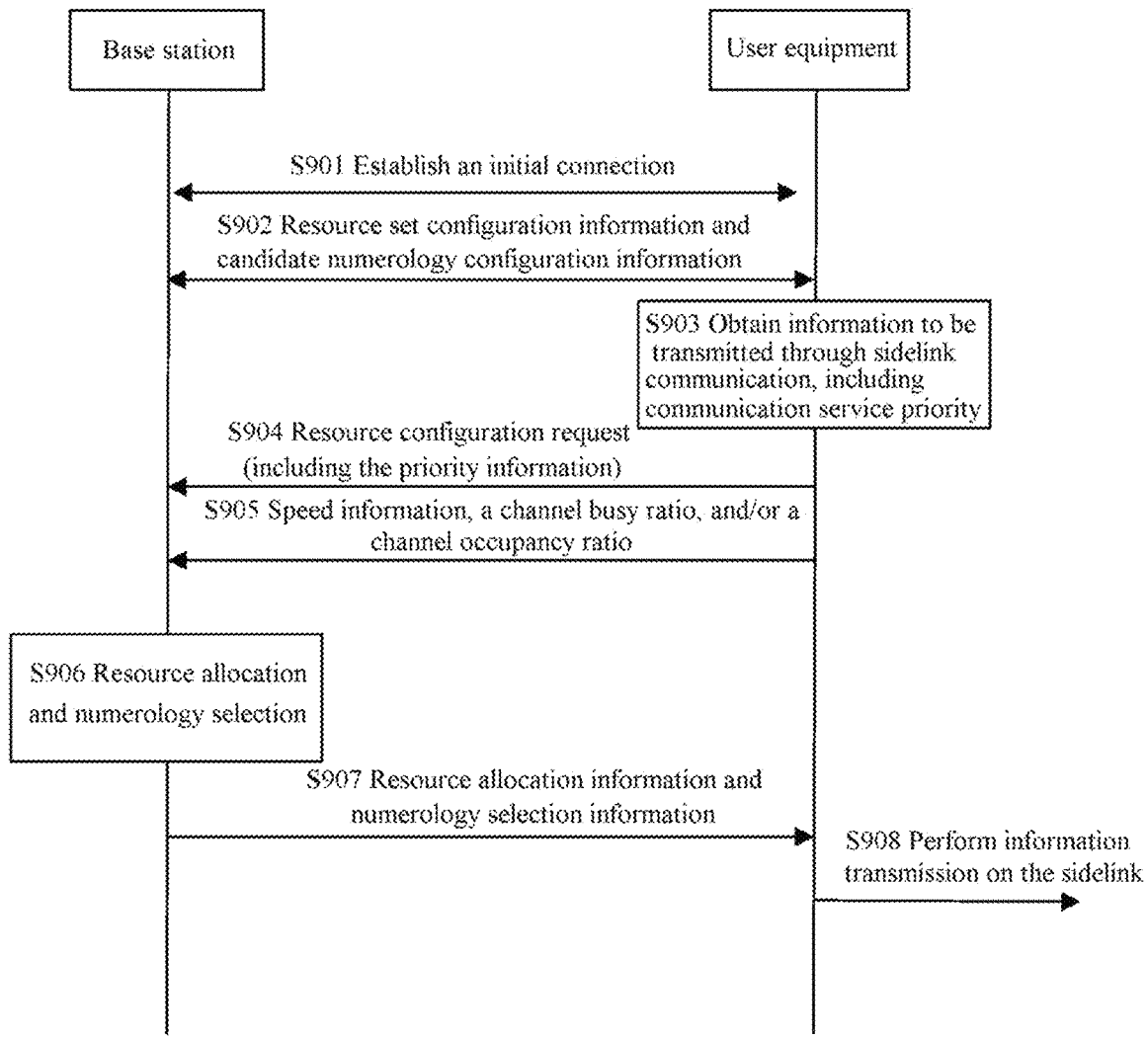
FIG. 9 is a flowchart showing an example of a signaling interaction process according to an embodiment of the present disclosure.

FIG. 9 is a flowchart showing an example of a signaling interaction process according to an embodiment of the present disclosure. This example corresponds to a scenario in which user equipment is located in a coverage of a base station and the base station configures the base station to perform resource scheduling.

As shown in FIG. 9, in step S901, an initial connection (i.e., RRC_CONNECTED) is established between the base station and the user equipment. Next, in step S902, the base station includes resource set configuration information and candidate numerology configuration information (including one or more numerologies determined by the base station based on, for example, one or more of the resource set configuration information, physical channel information and service type information) in, for example, RRC signaling to be transmitted to the user equipment. It should be noted that, in step S902, the resource set configuration information and the candidate numerology configuration information may be transmitted in association with each other to the user equipment, or may also be transmitted independently of each other.

Next, in step S903, the user equipment obtains information to be transmitted through the sidelink communication, including the communication service priority. In step S904, the user equipment includes the obtained priority information in a resource configuration request to be transmitted to the base station, to request the base station to allocate resources for the user equipment. In step S905, the user equipment reports the measured speed information, channel busy ratio, and/or channel occupancy ratio to the base station periodically or in response to an event trigger. In step S906, the base station may perform resource allocation and numerology selection based on one or more of the information from the user equipment. Next, in step S907, the base station delivers information about the allocated resources and the selected numerology to the user equipment through, for example, the sidelink grant. In the step S908, the user equipment may perform the sidelink communication based on the received resource configuration information and numerology configuration information for information transmission.

It should be noted that the signaling interaction process shown in FIG. 9 is only an example, and those skilled in the art may modify the example appropriately according to the principle of the present disclosure and actual conditions, and such modifications should obviously be considered to fall within the scope of the present disclosure. For example, instead of performing the above steps S904 and S905, the user equipment may integrate and pre-process the obtained information according to the received candidate numerology configuration information, to obtain, for example, indication information of a numerology selection range, and transmit the indication information to the base station. In a case that a correspondence between the resource set configuration information and the candidate numerology configuration information has been determined, the base station may perform resource allocation and numerology selection at the same time according to the indication information.

3-2. Example in Scenario of User Equipment Autonomously Selecting Resources in Case of Being in Coverage of Base Station FIG. 10 is a flowchart showing another example of a signaling interaction process according to an embodiment of the present disclosure.

This example corresponds to a scenario where user equipment is in a coverage of a base station and the base station configures the user equipment to autonomously select resources. In this example, candidate resource set configuration and candidate numerology configuration are still performed by the base station, but specific resource selection and numerology selection are performed on the user equipment side.

Figure 10:
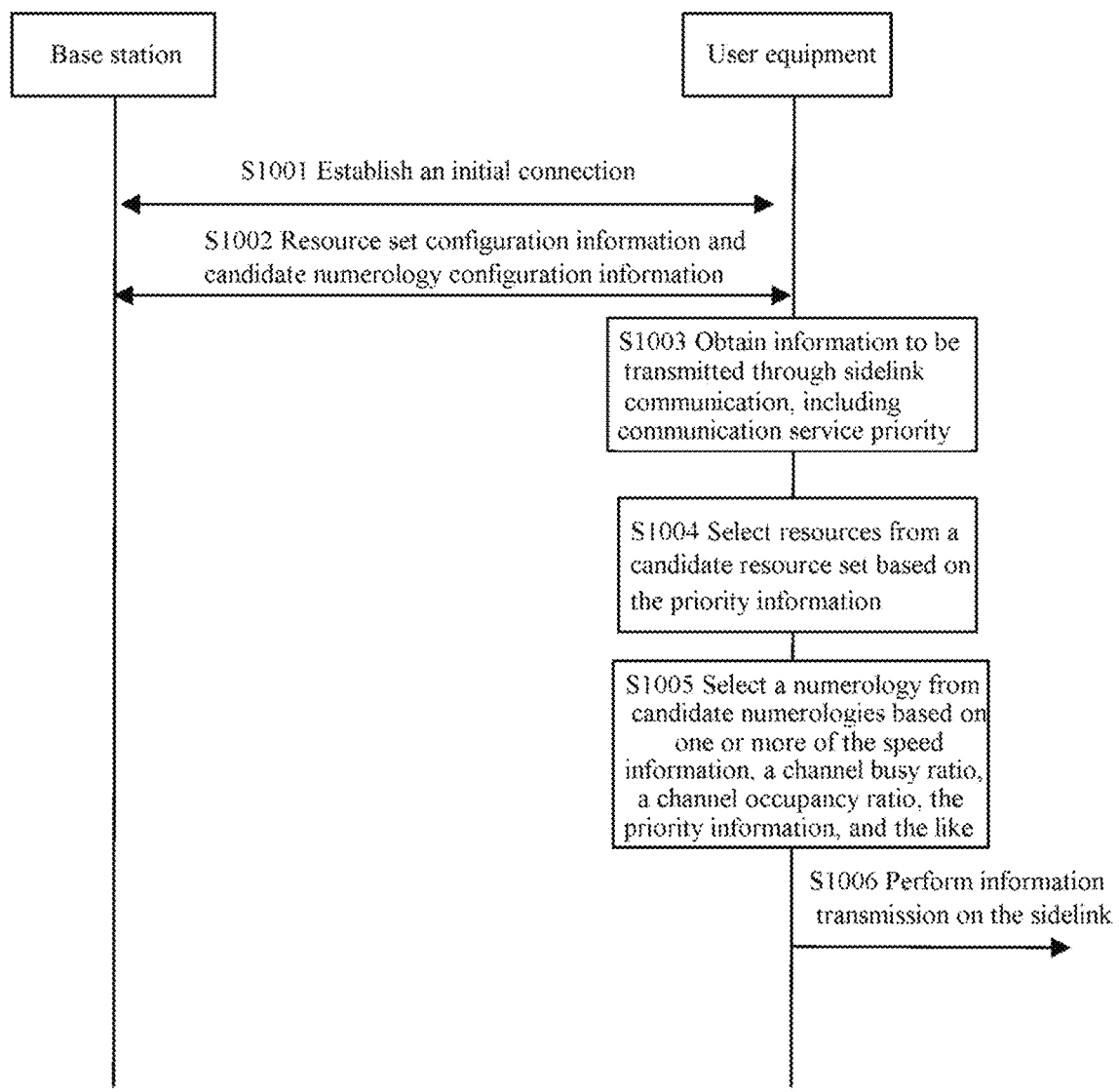
FIG. 10 is a flowchart showing another example of a signaling interaction process according to an embodiment of the present disclosure.

The processing in steps S1001 to S1003 shown in FIG. 10 is substantially the same as the processing in steps S901 to S903 shown in FIG. 9, and details are not described herein again. In step S1004, the user equipment selects resources from a candidate resource set configured by the base station based on the obtained data service priority. In step S1005, the user equipment selects a numerology to be used from candidate numerologies based on one or more of the speed information, the channel busy ratio, the channel occupancy ratio, the data service priority, and the like. Next, in step S1006, the user equipment performs the sidelink communication based on the selected resources and numerology for information transmission.

Similarly, it should be noted that the signaling interaction process shown in FIG. 10 is only an example, and those skilled in the art may modify the example appropriately according to the principle of the present disclosure and actual conditions, and such modifications should obviously be considered to fall within the scope of the present disclosure. For example, in a case that the resource configuration and the numerology configuration are associated with each other, the above steps S1004 and S1005 may be implemented in one step to simultaneously implement the resource selection and the numerology selection.

3-3. Examples in Scenario of Being Outside Coverage of Base Station

Figure 11:
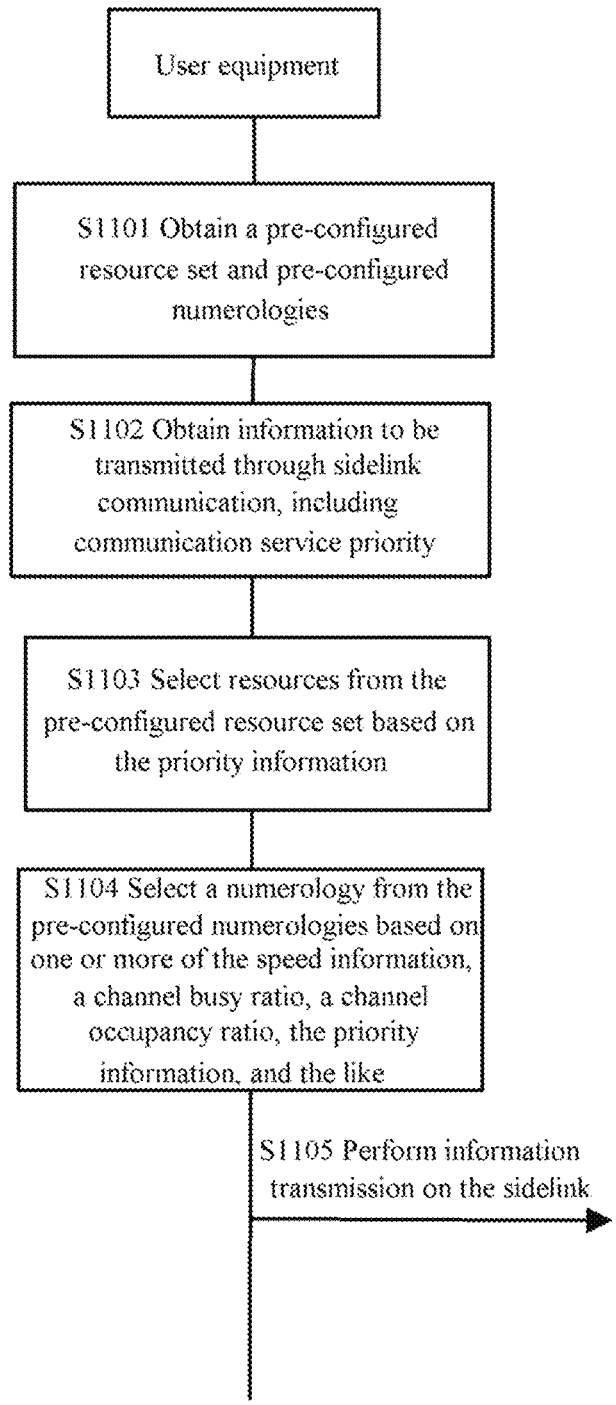
FIG. 11 is a flowchart showing another example of a signaling interaction process according to an embodiment of the present disclosure.

FIG. 11 is a flowchart showing another example of a signaling interaction process according to an embodiment of the present disclosure.

This example corresponds to a scenario where user equipment is located outside a coverage of a base station and thus autonomously select resources. Therefore, in this example, there is actually no signaling interaction process between the base station and the user equipment.

In the example shown in FIG. 11, the processing in steps S1102 to S1105 performed on the user equipment side is substantially the same as the processing in steps S1003 to S1006 described above with reference to FIG. 10, except that the user equipment may obtain default resource set configuration and numerology configuration or resource set configuration and numerology configuration received last time from the base station as the candidate resource set and numerology by reading the memory in step S1101, so that the user equipment selects resources and a numerology respectively from a preconfigured candidate resource set and preconfigured candidate numerologies in step S1103 and step S1104, rather than the user equipment selecting resources and a numerology respectively from the candidate resource set and the candidate numerologies configured in real time by the base station through RRC signaling in step S1004 and step S1005, and the user equipment performs the sidelink communication based on the selected resources and the selected numerology in step S1105.

Similarly, it should be noted that the signaling interaction process shown in FIG. 11 is only an example, and those skilled in the art may modify the example appropriately according to the principle of the present disclosure and actual conditions, and such modifications should obviously be considered to fall within the scope of the present disclosure. For example, the signaling interaction process may further include the following steps of the user equipment obtaining one or more of resource set configuration information, physical channel information and service type information and performing resource selection and numerology selection based on the information.

In addition, it should further be noted that although the steps are numbered in time series in FIG. 9 to FIG. 11 for ease of description, these numbers do not indicate the order in which the steps are performed. In fact, some steps may be performed in parallel, or the steps may be interchanged in their order, and so on.

4. Method Embodiment of Present Disclosure

Corresponding to the above device embodiments, the following method embodiments are provided in the present disclosure.

Figure 12:
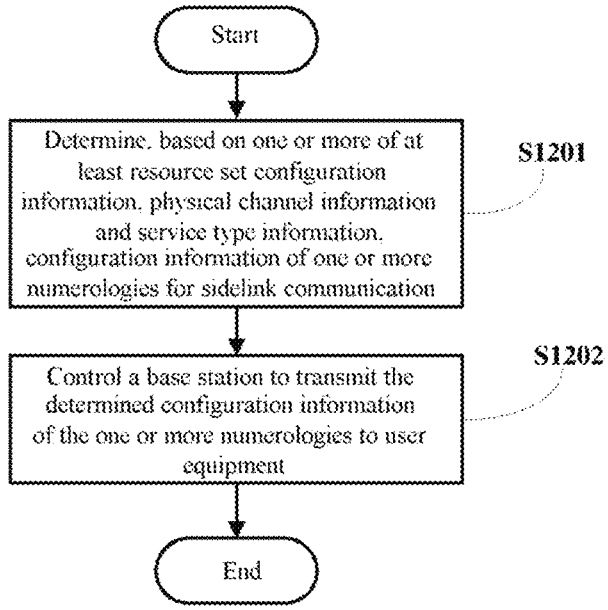
FIG. 12 is a flowchart showing a process example of a method on a base station side in a wireless communication system according to an embodiment of the present disclosure.

FIG. 12 is a flowchart showing a process example of a method on a base station side in a wireless communication system according to an embodiment of the present disclosure.

As shown in FIG. 12, the method according to this embodiment starts at step S1201. In step S1201, based on one or more of at least resource set configuration information, physical channel information and service type information, configuration information of one or more numerologies for sidelink communication is determined. A numerology includes at least subcarrier spacing and a cyclic prefix type, and preferably further includes one or more of the number of slots in a subframe, the number of OFDM symbols in a slot, and the number of slots in a frame.

Next, the method proceeds to step S1202. In step S1202, a base station is controlled to transmit the determined configuration information of the one or more numerologies to user equipment, for the user equipment to perform the sidelink communication based on the one or more numerologies. Preferably, the configuration information may be included in high layer signaling such as RRC signaling and is transmitted to the user equipment in association with the resource set configuration information.

Preferably, the method may further include the following steps of: selecting, based on information related to one or more of at least a movement speed of the user equipment, a channel busy ratio, a channel occupancy ratio and a data service priority of the sidelink communication from the user equipment, a numerology for the sidelink communication from the one or more numerologies; and including the selected numerology in physical layer signaling such as sidelink grant to be transmitted to the user equipment. Further, preferably, in a case that the sidelink communication is carrier aggregation communication, a numerology for each component carrier in the carrier aggregation communication is selected from the one or more numerologies.

It should be noted that the method embodiment on the base station side described with reference to FIG. 12 corresponds to the device embodiment on the base station side described above, and the content that is not described in detail herein may refer to the description at the corresponding position above, which is not repeated herein.

Figure 13:
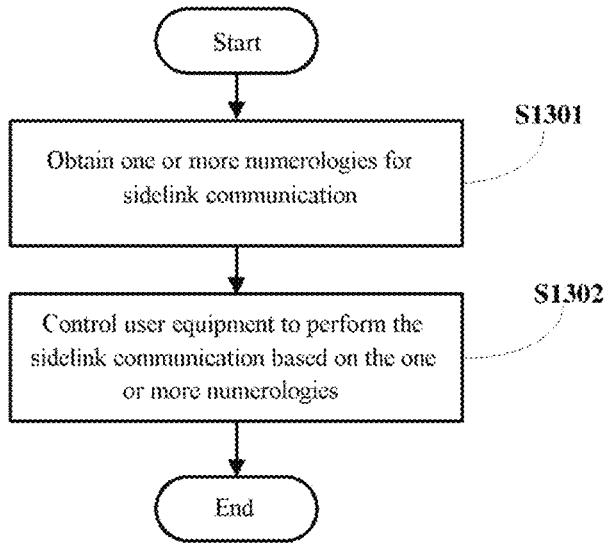
FIG. 13 is a flowchart showing a process example of a method on a user equipment side in a wireless communication system according to an embodiment of the present disclosure.

FIG. 13 is a flowchart showing a process example of a method on a user equipment side in a wireless communication system according to an embodiment of the present disclosure.

As shown in FIG. 13, the method according to this embodiment starts at step S1301. In step S1301, one or more numerologies for sidelink communication are obtained. Preferably, the one or more numerologies may be obtained by decoding configuration information included in, for example, high layer signaling from a base station. Alternatively, the one or more numerologies may be pre-configured.

Next, the method proceeds to step S1302. In step S1302, user equipment is controlled to perform the sidelink communication based on the one or more numerologies.

Preferably, the method may further include the following steps of: transmitting information related to one or more of at least a movement speed of the user equipment, a channel busy ratio, a channel occupancy ratio, and a data service priority of the sidelink communication, and optionally other information to the base station; obtaining a numerology selected by the base station based on the information by decoding, for example, the physical layer signaling from the base station; and performing the sidelink communication based on the selected numerology.

Preferably, the method may further include one or more of the following steps: selecting, based on information related to one or more of at least a movement speed of the user equipment, a channel busy ratio, a channel occupancy ratio, and a data service priority of the sidelink communication, and optionally based on information related to other device involved in the sidelink communication, a numerology for the sidelink communication from the one or more numerologies, and performing the sidelink communication based on the selected numerology; including the selected numerology in, for example, SCI signaling to be transmitted to other device; and obtaining the numerology by decoding the SCI signaling from the other device, and performing information reception based on the obtained numerology.

It should be noted that the method embodiment on the user equipment side described with reference to FIG. 13 corresponds to the device embodiment on the user equipment side described above, and the content that is not described in detail herein may refer to the description at the corresponding position above, which is not repeated herein.

It should further be noted that although the process examples of the method in a wireless communication system according to the embodiments of the present disclosure are described above, the process examples are only exemplary and non-limitative. Those skilled in the art may modify the above embodiments according to the principle of the present disclosure, for example, add, delete, or combine the steps in the above embodiments, and such modifications fall within the scope of the present disclosure.

In addition, it should further be noted that although the process examples of the method in a wireless communication system according to the embodiments of the present disclosure are described in the order of a flowchart in the drawings and the above description, the order of performing the method in the present disclosure is not limited thereto. The processes may be performed in parallel or as needed.

5. Example of Application Scenario of Technology of Present Disclosure

Applications of the technology of the present disclosure are described below in conjunction with specific scenario examples, and preferred configurations of a numerology respectively suitable for the application scenario examples are given. It should be noted that in the description for each application scenario example, only specific configuration in the application scenario is described in detail, and the detailed description of the common configuration in various application scenarios described above is omitted.

5-1. Example in NR V2V Scenario

Figure 14:
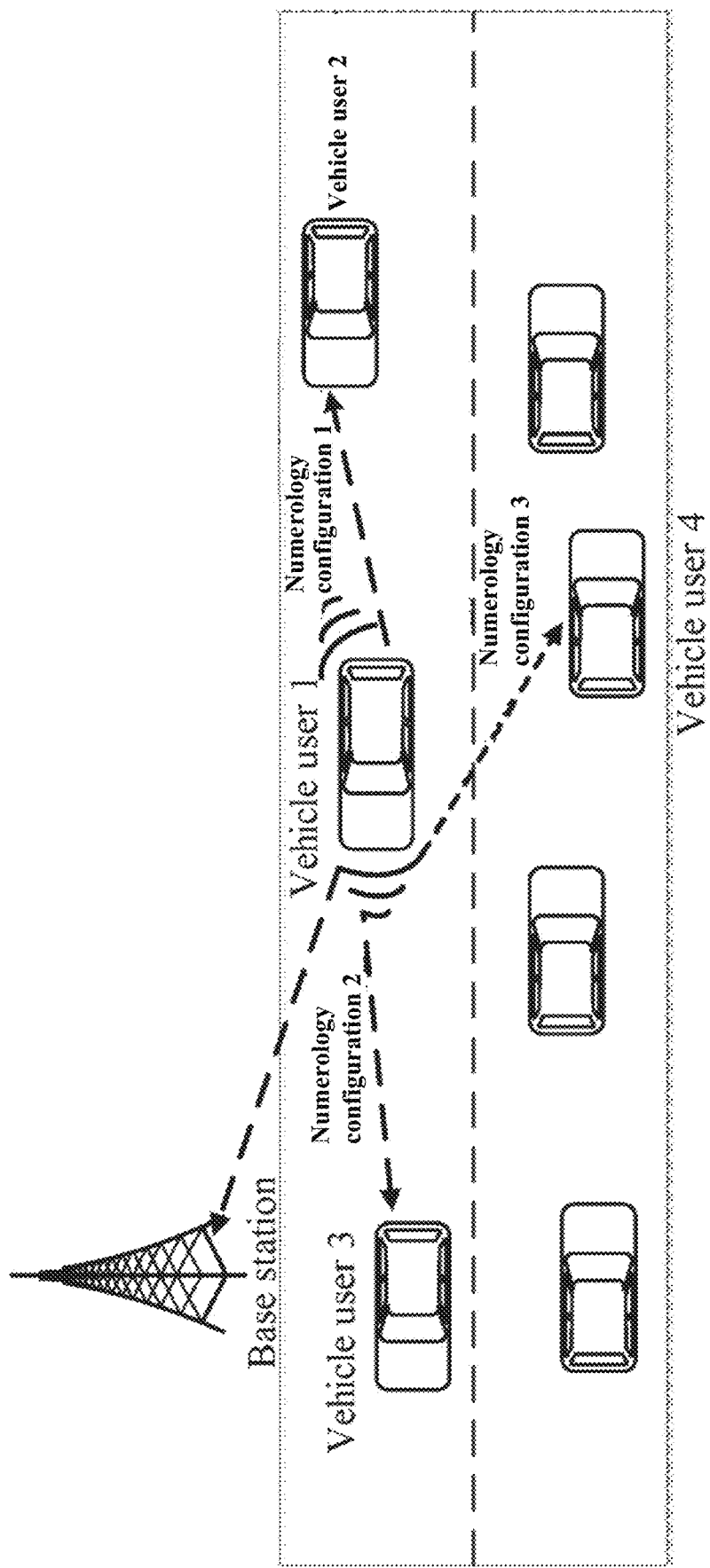
FIG. 14 is a schematic diagram showing an application example of the technology of the present disclosure in a vehicle to vehicle (V2V) communication scenario.

FIG. 14 is schematic diagram showing an application example of the technology of the present disclosure in a vehicle to vehicle (V2V) communication scenario.

As shown in FIG. 14, a vehicle user 1 performs sidelink communication with multiple vehicle users 2, 3 and 4 at the same time, and the vehicle user 1 is in a coverage of a base station, so that the vehicle user 1 may receive configuration information of one or more candidate numerologies and one or more candidate resource sets from the base station.

Since the vehicle user 1 has a requirement for sidelink communication with multiple vehicle users, the base station or the vehicle user 1 may select, based on the above-mentioned information such as the data service priority, the channel busy ratio, the channel occupancy ratio and the movement speed, numerologies respectively for the sidelink communication between the vehicle user 1 and the vehicle users 2, 3 and 4, which are respectively labeled as numerology configuration 1, numerology configuration 2, and numerology configuration 3 in FIG. 14. After completing resource allocation and numerology selection, the vehicle user 1 may perform V2V communication with the vehicle users 2, 3 and 4 respectively based on the numerology configuration 1, the numerology configuration 2 and the numerology configuration 3. It should be noted that the numerology configuration 1, the numerology configuration 2 and the numerology configuration 3 herein may be the same as or different from each other, and may be specifically set according to actual communication conditions, which is not limited in the present disclosure.

In this example, by selecting an appropriate numerology based on factors such as a service type, a channel condition, a movement speed and a characteristic of a receiving party, requirements on performance indicators such as time delay and reliability can be ensured for V2V communication between different vehicles for.

Considering characteristics of V2V services, that is, there are both security-type services that have high demands for time delay and data-type services that have high demands for throughput and spectrum utilization, and further considering that the NR V2V and the LTE V2V may coexist for a long time in a future communication scenario, values of the parameter $\mu$ respectively corresponding to numerologies that may be supported in the scenario may include −4, −3, −2, −1, 0, 1, 2, 3, 4, 5, 6, and 7. Preferably, the values of the parameter $\mu$ may include −3, −2, −1, 0, 1, 2, 3, and 4. Further preferably, the values of the parameter $\mu$ may include −2, −1, 0, 1, and 2. If only one fixed numerology can be selected as the only use range for the V2V, $\mu=0$ should be selected considering the coexistence of the NR V2V and the LTE V2V, that is, numerology configuration with the subcarrier spacing of 15 kHz is selected.

5-2. Example in NR V2X Platooning Scenario

Figure 15:
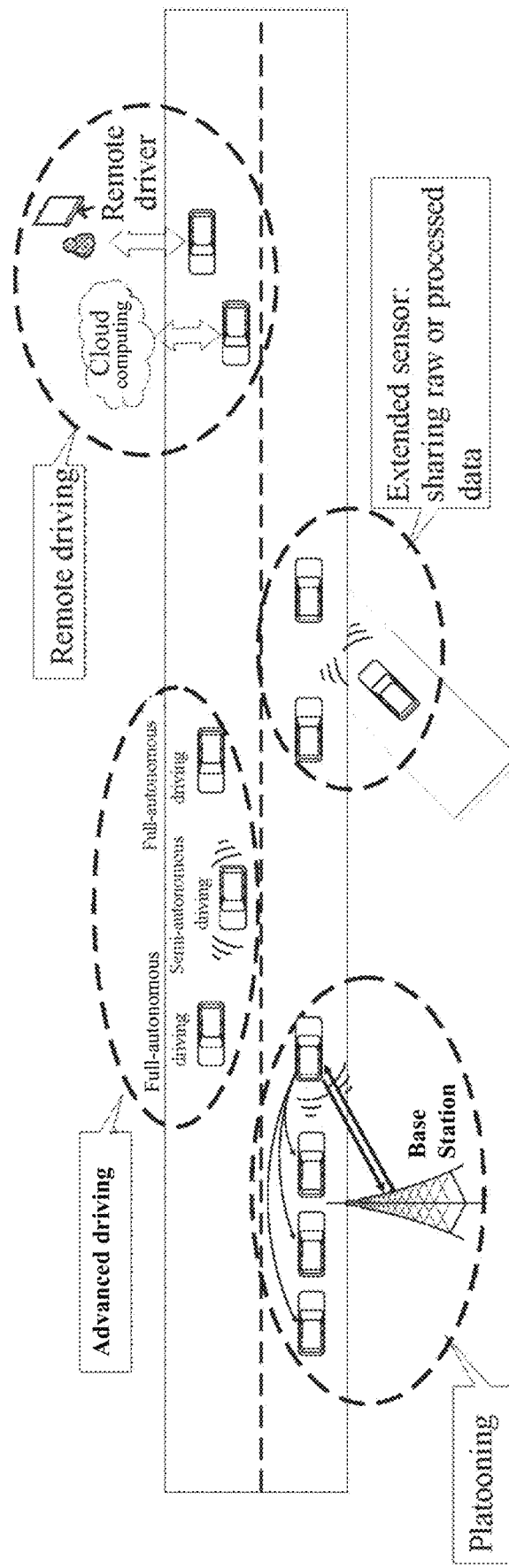
FIG. 15 is a schematic diagram showing four types of usage scenarios of the V2X.

FIG. 15 is a schematic diagram showing four types of usage scenarios of the V2X.

As shown in FIG. 15, the V2X includes four types of usage scenarios, i.e., a platooning scenario, a remote driving scenario, an advanced driving scenario, and a scenario of supporting extended sensors. Each of the usage scenarios may apply the technology of the present disclosure to support configurable numerology design.

Figure 16:
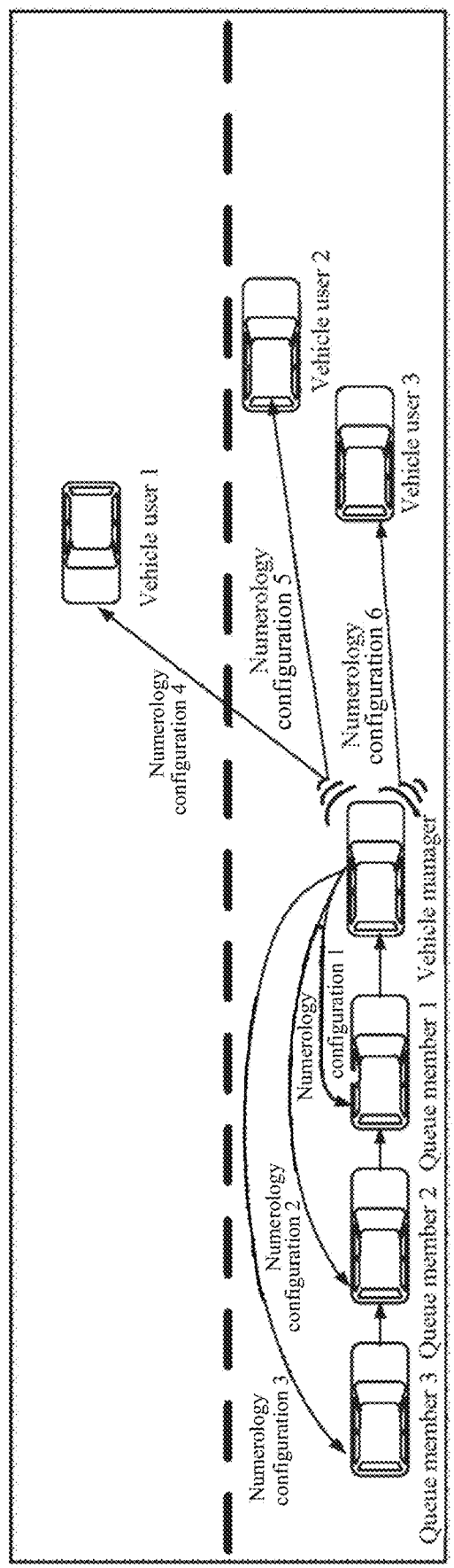
FIG. 16 is a schematic diagram showing an application example of the technology of the present disclosure in a platooning scenario of the V2X.

An example in a platooning scenario is described in further detail below as an example. FIG. 16 is a schematic diagram showing an application example of the technology of the present disclosure in a platooning scenario of the V2X.

As shown in FIG. 16, in the platooning scenario, a head vehicle user as a vehicle fleet manager needs to be responsible for resource application, allocation, and public information broadcasting in the vehicle fleet driving process. The vehicle fleet manager uses numerology configuration 4 to numerology configuration 6 to perform V2V communication with vehicle users 1, 2 and 3, respectively, which is similar to the application scenario example described above with reference to FIG. 14 and is not described in detail herein.

Taking broadcast communication as an example, an example in which the vehicle fleet manager is responsible for applying for numerologies for broadcast communication between vehicle fleet members in this scenario is described. The specific process is as follows. The head vehicle user and the vehicle fleet members share basic user information, including but not limited to the following: a movement speed, a service type, an information processing capability (whether to support carrier aggregation, a processing capability of a receiver, and the like), a priority of a data service to be transmitted, resource allocation, and the like.

The head vehicle user as the vehicle fleet manager knows the basic user information of other vehicle fleet members. In this case, the head vehicle user may select the numerologies for the information broadcasting between the vehicle fleet members. Alternatively, the head vehicle user may forward the known information of the other vehicle fleet members to the base station, for the base station to select the numerologies.

The head vehicle user informs the other vehicle fleet member users of the selected numerology configuration through SCI signaling of communication in the vehicle fleet. The selected numerology configuration may be transmitted to the other vehicle fleet member users through broadcast, multicast, and/or unicast.

The vehicle fleet members obtain the selected numerology configuration by decoding related signaling.

The head vehicle user uses the selected numerology configuration for information broadcasting, and the other vehicle fleet members receive the information broadcasted by the head vehicle user based on the numerology configuration obtained by performing decoding.

In this scenario example, different numerologies may be provided for different content in broadcast communication, which can effectively improve the resource usage efficiency.

In addition, it should be noted that the numerology configuration 1 to the numerology configuration 3 shown in FIG. 16 indicate that each vehicle fleet member may perform V2V communication with other vehicle users while receiving broadcast content from the vehicle manager. The numerology configuration 1 to the numerology configuration 3 represent the numerology configuration used by the vehicle manager when performing the V2V communication with a queue member 1 to a queue member 3, respectively. The numerology configuration 1 to the numerology configuration 3 may be the same as or different from each other, which is not described in detail herein.

Considering the characteristics of the platooning scenario, that is, a head vehicle functions as the vehicle manager to manage vehicle fleet members and apply for resources, and the vehicle fleet members frequently performs communication, information involving a large amount of data such as camera information is required to be shared, and security information may be required to be shared timely. The values of the parameter $\mu$ corresponding to numerologies that may be supported in this scenario may include −4, −3, −2, −1, 0, 1, 2, 3 and 4, and preferably include −2, −1, 0, 1 and 2. If only one fixed numerology can be selected, $\mu=0$ should be selected considering the coexistence of the NR V2X and the LTE V2X, that is, numerology configuration with the subcarrier spacing of 15 kHz is selected.

5-3. Example in NR Sidelink Carrier Aggregation Communication Scenario

Figure 17:
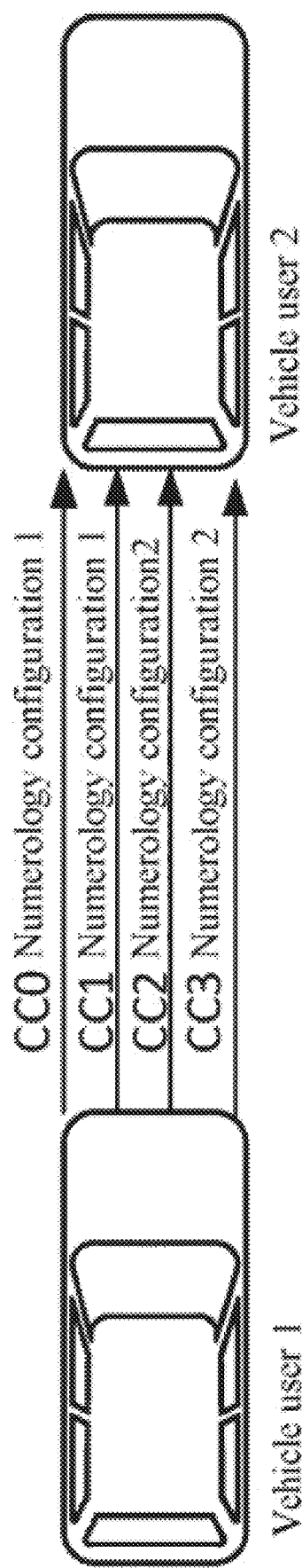
FIG. 17 is a schematic diagram showing an application example of the technology of the present disclosure in a carrier aggregation communication scenario.

FIG. 17 is schematic diagram showing an application example of the technology of the present disclosure in a carrier aggregation communication scenario.

As shown in FIG. 17, it is assumed that, after a vehicle user 1 and a vehicle user 2 have established basic sidelink communication (which is the V2V communication herein) based on the above process, the vehicle user 1 and the vehicle user 2 are to perform carrier aggregation communication according to needs of both communication parties or according to instructions of high layer signaling, and need to perform operations such as measurement, carrier selection, and aggregation. In this case, an appropriate numerology may be configured for each aggregated component carrier. In the example shown in FIG. 17, it is assumed that the vehicle user 1 serves as a transmitting party and the vehicle user 2 serves as a receiving party, and four component carriers are aggregated, which are respectively a component carrier CC0, a component carrier CC1, a component carrier CC2, and a component carrier CC3.

According to the type of service carried by each component carrier, the communication condition of the carrier, and the like, an appropriate numerology may be configured for the component carrier. The specific configuration process is as follows. The vehicle user 1 obtains basic information such as service content required to be transmitted in the carrier aggregation, carrier selection and resource allocation from high layer configuration or through sidelink communication (for example, the basic V2V communication established above) with the vehicle user 2.

☐ Numerology configuration used by different component carriers in the communication process is selected based on the communication condition and the service type corresponding to each component carrier. The selection may be performed by the base station, performed by the vehicle user 1 alone, or performed by the vehicle user 1 together with the vehicle user 2, which is not limited in the present disclosure.

☐ The Vehicle user 1 informs the vehicle user 2 of the numerology configuration selected for each component carrier through one of the component carriers, or the base station may transmit the numerology configuration corresponding to each component carrier to the vehicle user 1 and the vehicle user 2.

☐ The vehicle user 1 and the vehicle user 2 perform the carrier aggregation communication based on the numerology configured for each component carrier.

In the example shown in FIG. 17, the component carrier CC0 and the component carrier CC1 correspond to the numerology configuration 1, and the component carrier CC2 and the component carrier CC3 correspond to the numerology configuration 2, which is only exemplary and non-limitative. The component carriers CC0 to CC3 may correspond to the same or different numerology configurations according to actual communication conditions.

In the carrier aggregation communication scenario, by selecting corresponding numerology configuration according to factors such as the communication condition and the transmission content of each component carrier, the efficiency of carrier aggregation can be effectively improved.

Due to the characteristics of the carrier aggregation, the communicating parties may use multiple component carriers to perform communication simultaneously or not simultaneously. For example, different component carriers may transmit different types of communication services. The values of the parameter μ corresponding to numerologies that may be supported in this scenario may include −4, −3, −2, −1, 0, 1, 2, 3 and 4, and may preferably include −4, −3, −2, −1, 0, 1 and 2. Particularly, the values of the parameter μ which are more suitable for the component carrier for signaling and control information transmission in the carrier aggregation communication may include 0, 1 and 2, and the values of the parameter μ which are more suitable for the component carrier for data service transmission may include −2, −1 and 0.

5-4. Example in NR D2D Scenario

Figure 18:
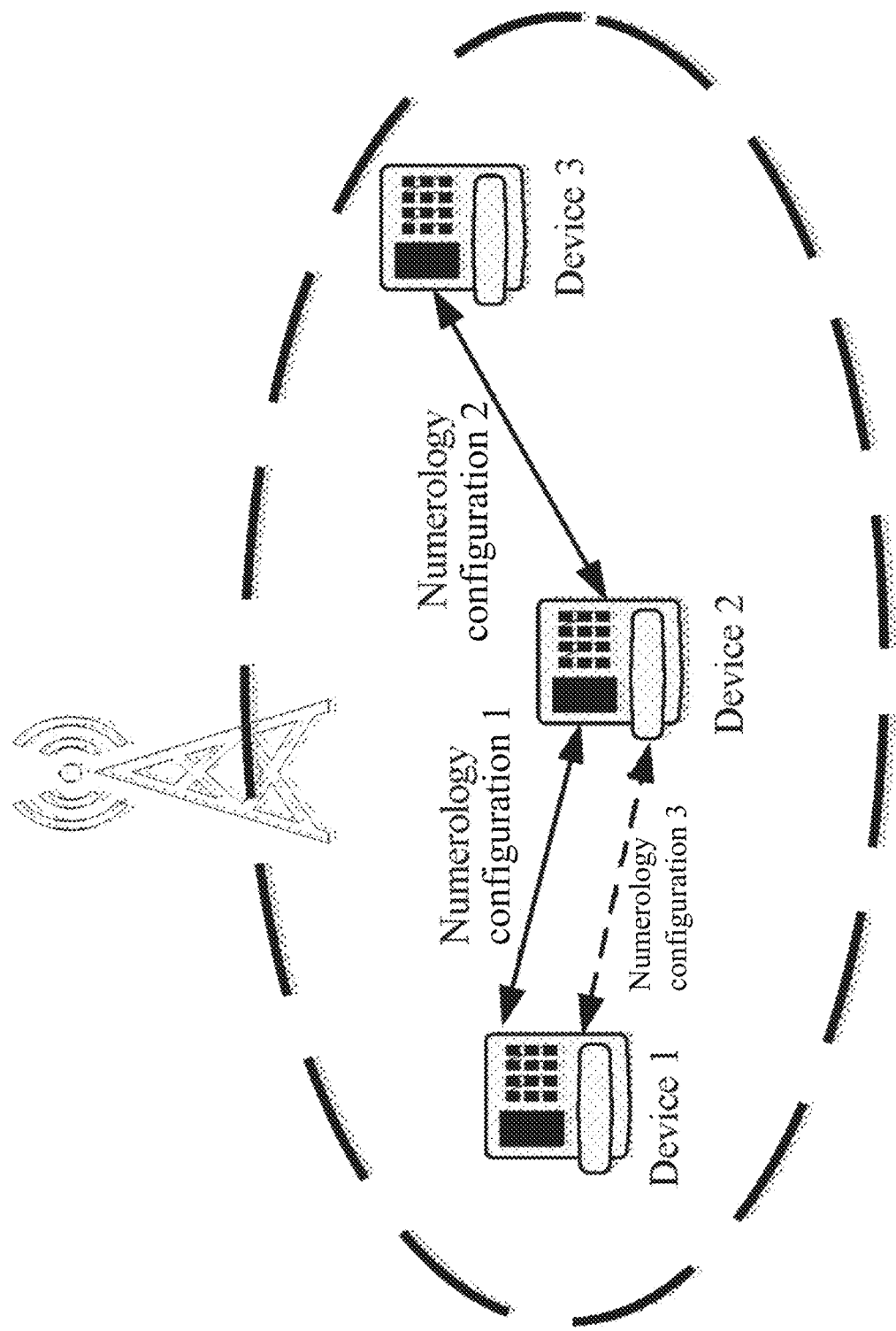
FIG. 18 is a schematic diagram showing an application example of the technology of the present disclosure in a D2D communication scenario.

FIG. 18 is schematic diagram showing an application example of the technology of the present disclosure in a D2D communication scenario.

As shown in FIG. 18, a device 1, a device 2, and a device 3 are all in a coverage of a base station, where the device 2 performs device to device (D2D) communication with the device 1 and the device 3, respectively. The communication content between the device 2 and the device 1 may be not necessarily the same as the communication content between the device 2 and the device 3, and thus different numerology configurations may be applicable. In addition, as the transmission content and the requirements change, the numerology configuration used for the device to device communication between devices will also change. The switching process may be as follows.

The device 2 and the device 1 use numerology configuration 1 for the device to device communication, which is indicated by a solid arrow in FIG. 18.

The communication condition, the requirements and the service content for the device to device communication between the device 2 and the device 1 change, the numerology configuration 1 is no longer applicable in the communication process, and numerology configuration 3 is applicable.

The device 2 and the device 1 switch to the numerology configuration 3 for the device to device communication after the expiry of the agreed time, which is indicated by a dashed arrow in FIG. 18.

In the D2D scenario, different numerology configurations may be switched according to different communication needs, to effectively cope with the impact of scenario changes.

Similarly, in a machine type communication (MTC) scenario and other sidelink communication scenarios, the numerology having more suitable configuration may be flexibly selected according to the change in communication requirements.

Considering the characteristics of the device to device communication, the values of the parameter μ corresponding to the numerologies that may be supported in this scenario may include −2, −1, 0, 1, 2, 3, 4, 5, 6 and 7, and preferably include −2, −1, 0, 1, 2 and 3.

5-5. Example in NR Unmanned Aerial Vehicle Communication Scenario

Figure 19:
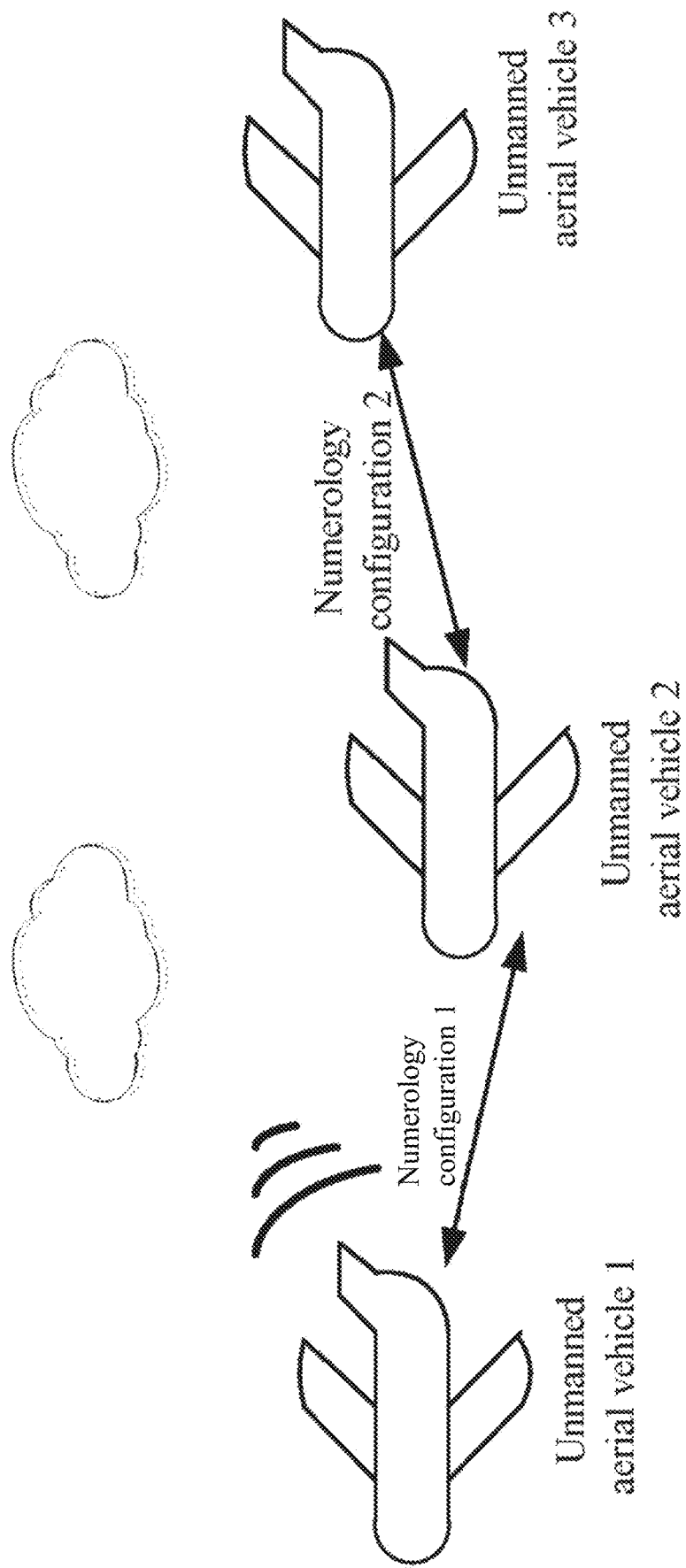
FIG. 19 is a schematic diagram showing an application example of the technology of the present disclosure in an unmanned aerial vehicle communication scenario.

FIG. 19 is a schematic diagram showing an application example of the technology of the present disclosure in an unmanned aerial vehicle communication scenario.

In the example shown in FIG. 19, an unmanned aerial vehicle 1 functions as a vanguard user, which has a similar function to the head vehicle user. An application example in the unmanned aerial vehicle communication scenario shown in FIG. 19 is substantially the same as the application example in the V2X platooning scenario described above with reference to FIG. 16, which is not repeated herein. The only difference is that, considering the characteristics of the unmanned aerial vehicle communication, additional factors such as a current height of the user equipment, an altitude, a wind speed, an air pressure, a temperature, a visibility, a humidity are required to be considered in the numerology selection process.

Considering the characteristics of the unmanned aerial vehicle communication scenario, that is, a data volume requirement and a delay requirement higher than the V2X scenario, the values of the parameter µ corresponding to the numerologies that may be supported in this scenario may include −7, −6, −5, −4, −3, −2, −1, 0, 1, 2, 3, 4, 5, 6, 7 and 8. If the communication reliability is prioritized, the values of parameter µ may preferably include 2, 3, 4 and 5. If the communication effectiveness is prioritized, the values of parameter µ may preferably include −6, −5, −4 and −3.

5-6. Example in NR V2I Scenario

Figure 20:
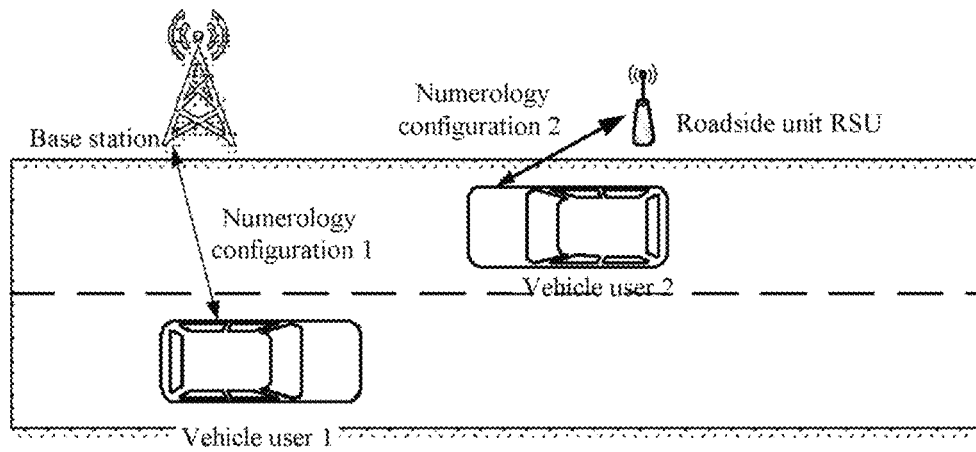
FIG. 20 is a schematic diagram showing an application example of the technology of the present disclosure in a V2I scenario.

FIG. 20 is schematic diagram showing an application example of the technology of the present disclosure in a V2I scenario.

As shown in FIG. 20, a vehicle user 1 and a vehicle user 2 perform vehicle to infrastructure (V2I) communication respectively with a base station and a roadside unit (RSU), and thus two different numerology configurations including numerology configuration 1 and numerology configuration 2 are respectively applicable. As the content and requirements of the vehicle to infrastructure (V2I) communication change, the numerology configuration applicable to the communication process will also change. The specific numerology selection is delivered and configured by the base station or the roadside unit facility, so that the vehicle user can dynamically adjust the used numerology in the communication process.

Considering the communication characteristics of the V2I scenario, that is, the communicating parties are respectively a vehicle user and a relatively fixed infrastructure, the values of the parameter µ corresponding to the numerologies that may be supported in this scenario may include −2, −1, 0, 1, 2, 3, 4 and 5, and may preferably include −1, 0, 1 and 2.

It should be noted that although the possible selection ranges of the numerology configuration in each application scenario are given above for the characteristics of each application scenario, numerologies different from the above example selection range in each application scenario may be selected according to the actual situations. The selection of these different numerologies should also be considered to fall within the protection scope of the present disclosure.

It should further be noted that, although examples of application scenarios of the technology of the present disclosure are described above with reference to FIGS. 14 to 20, it should be understood that the examples are only exemplary and non-limitative. Those skilled in the art may appropriately modify the technology of the present disclosure based on the characteristics of the application scenario according to the principle of the present disclosure, to be suitable for to any sidelink communication scenario in addition to the above example scenario.

According to the embodiments of the present disclosure and the examples of application scenarios, it is proposed according to the characteristics of the NR sidelink communication to flexibly and reasonably configure the numerology by comprehensively considering one or more actors according to the actual application scenario, so as to meet communication performance requirements in various application scenarios of the sidelink communication, which is different from fixed numerology configuration in the sidelink communication in the conventional technology. In addition, an effective solution to enable the transmitting party and the receiving party of the sidelink communication to synchronize the numerology configuration is provided for the proposed configurable numerology.

It should be noted that, instead of or in addition to the above advantages, other advantages and effects are apparent to those skilled in the art after reading the technical content of the present disclosure, which is not listed herein.

It should further be noted that although the embodiments of the present disclosure have been described above for the cases of numerology selection being performed by the base station and by the user equipment, the embodiments are only for convenience of description and clarity and are not intended to limit the present disclosure. In practical applications of the technology of the present disclosure, the above-mentioned embodiments may be appropriately combined. In addition, it should be noted that, regardless of whether the base station or the user equipment selects the numerology finally used for the sidelink communication, the above-mentioned selection factors should be specifically considered according to the actual application scenario, in order to take into account both the system stability and spectrum efficiency.

In addition, an electronic apparatus is further provided according to an embodiment of the present disclosure. The electronic apparatus may include a transceiver and one or more processors. The one or more processors may be configured to perform the method in a wireless communication system or functions of corresponding units in the apparatus in a wireless communication system according to the embodiments of the present disclosure described above. The transceiver may perform the corresponding communication function.

It should be understood that the machine-executable instructions in a storage medium and a program product according to an embodiment of the present disclosure may further be configured to perform a method corresponding to the above device embodiment, and thus the contents which are not described in detail herein may be referred to the above description at corresponding positions and are not repeated herein.

Accordingly, a storage medium for carrying the above-described program product storing the machine-executable instructions is also included in the present disclosure. The storage medium includes, but is not limited to, a floppy disk, an optical disk, a magneto-optical disk, a storage card, a memory stick or the like.

Figure 21:
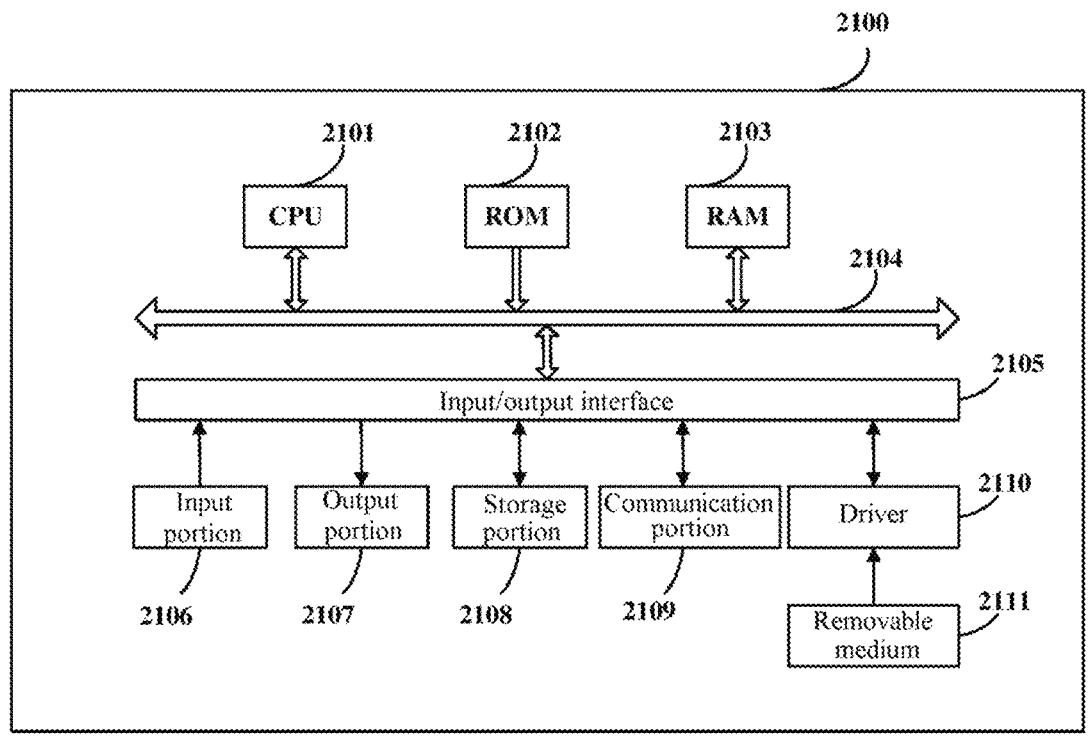
FIG. 21 is a block diagram showing an exemplary structure of a personal computer as an information processing apparatus according to an embodiment of the present disclosure.

6. Computing Device for Implementing Apparatus and Method Embodiments of Present Disclosure In addition, it should further be noted that the series of processing and the devices described above may also be by software and/or firmware. In a case of implementing by software and/or firmware, a program constituting the software may be installed from a storage medium or a network to a computer having a dedicated hardware structure, for example, a general-purpose personal computer 2100 shown in FIG. 21. The computer may perform various functions when being installed with various programs. FIG. 21 is a block diagram showing an exemplary structure of a personal computer as an information processing apparatus according to an embodiment of the present disclosure.

In FIG. 21, a central processing unit (CPU) 2101 performs various types of processing according to programs stored in a read only memory (ROM) 2102 or programs loaded from a storage portion 2108 to a random access memory (RAM)

2103. Data required when the CPU 2101 performs various types of processing is stored in the RAM 2103 as needed.

The CPU 2101, the ROM 2102 and the RAM 2103 are connected to each other via a bus 2104. An input/output interface 2105 is also connected to the bus 2104.

The following components are connected to the input/output interface 2105: an input portion 2106 including a keyboard, a mouse or the like, an output portion 2107 including a display such as a cathode ray tube (CRT) and a liquid crystal display (LCD), a speaker or the like, a storage portion 2108 including a hard disk or the like, and a communication portion 2109 including a network interface card such as a LAN card, a modem or the like. The communication portion 2109 performs communication processing via a network such as the Internet.

A driver 2110 may also be connected to the input/output interface 2105 as needed. A removable medium 2111 such as a magnetic disk, an optical disk, a magneto-optical disk and a semiconductor memory may be installed on the driver 2110 as needed, such that the computer programs read from the removable medium 2111 are installed in the storage portion 2108 as needed.

In a case that the series of processing described above is implemented by software, programs constituting the software are installed from a network such as the Internet or a storage medium such as the removable medium 2111.

Those skilled in the art should understand that the storage medium is not limited to the removable medium 2111 shown in FIG. 21 in which programs are stored and which is distributed separately from the apparatus to provide the programs to the user. An example of the removable medium 2111 includes: a magnetic disk (including a floppy disk (registered trademark)), an optical disk (including a compact disk read only memory (CD-ROM) and a digital versatile disk (DVD)), a magneto-optical disk (including a mini-disk (MD) (registered trademark)) and a semiconductor memory. Alternatively, the storage medium may be the ROM 2102, a hard disk included in the storage portion 2108 or the like. The programs are stored in the storage medium, and the storage medium is distributed to the user together with the device including the storage medium.

7. Application Example of Technology of Present Disclosure

The technology of the present disclosure may be applied to various products. For example, the base station mentioned in the present disclosure may be implemented as a gNodeB (gNB), any type of eNB (such as a macro eNB and a small eNB), a transmission reception point (TRP), or an Enterprise Long Term Evolution (eLTE)-eNB. The small eNB may be an eNB covering a cell smaller than a macro cell, such as a pico eNB, a micro eNB or a home (femto) eNB. Alternatively, the base station may be implemented as any other type of base station, such as a NodeB and a Base Transceiver Station (BTS). The base station may include: a main body (also referred to as a base station apparatus) configured to control wireless communication; and one or more Remote Radio Heads (RRH) arranged at positions different from the main body. In addition, various types of terminals described below may operate as a base station by performing functions of the base station temporarily or in a semi-persistent manner.

For example, the user equipment mentioned in the present disclosure may be implemented as a vehicle, a mobile terminal (such as a smart phone, a tablet personal computer (PC), a notebook PC, a portable game terminal, a portable/dongle mobile router and a digital camera), a vehicle terminal (such as a car navigation apparatus), an unmanned aerial vehicle, or a mobile station. The user equipment may also be implemented as a terminal (also referred to as a machine type communication (MTC) terminal) that performs machine-to-machine (M2M) communication. In addition, the user equipment may be a wireless communication module (such as an integrated circuit module including a single wafer) installed on each of the above terminals.

Application examples of the present disclosure are described below with reference to FIGS. 18 to 21.

7-1. Application Example On Base Station

First Application Example

Figure 22:
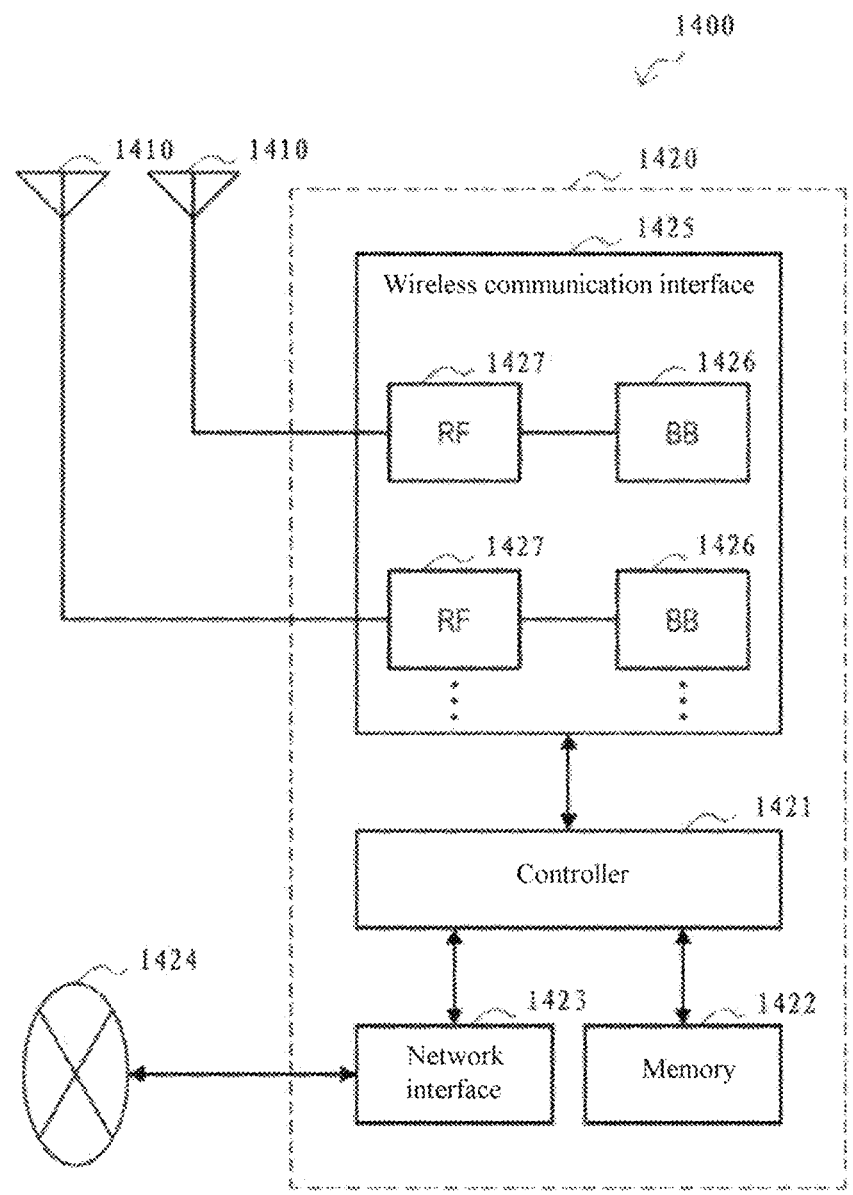
FIG. 22 is a block diagram showing a first schematic configuration example of an evolution node (eNB) to which the technology of the present disclosure may be applied.

FIG. 22 is a block diagram showing a first schematic configuration example of an eNB to which the technology of the present disclosure may be applied. An eNB 1400 includes one or more antennas 1410 and a base station apparatus 1420. The base station apparatus 1420 and each antenna 1410 may be connected to each other via an RF cable.

Each of the antennas 1410 includes a single or multiple antenna elements (such as multiple antenna elements included in a multi-input multi-output (MIMO) antenna), and is used for the base station apparatus 1420 to transmit and receive wireless signals. As shown in FIG. 22, the eNB 1400 may include the multiple antennas 1410. For example, the multiple antennas 1410 may be compatible with multiple frequency bands used by the eNB 1400. Although FIG. 22 shows the example in which the eNB 1400 includes the multiple antennas 1410, the eNB 1400 may also include a single antenna 1410.

The base station apparatus 1420 includes a controller 1421, a memory 1422, a network interface 1423, and a wireless communication interface 1425.

The controller 1421 may be, for example, a CPU or a DSP, and operates various functions of a higher layer of the base station apparatus 1420. For example, the controller 1421 generates a data packet from data in signals processed by the wireless communication interface 1425, and transfers the generated packet via the network interface 1423. The controller 1421 may bundle data from multiple base band processors to generate the bundled packet, and transfer the generated bundled packet. The controller 1421 may have logical functions of performing control such as radio resource control, radio bearer control, mobility management, admission control and scheduling. The control may be performed in corporation with an eNB or a core network node in the vicinity. The memory 1422 includes a RAM and a ROM, and stores a program executed by the controller 1421, and various types of control data (such as a terminal list, transmission power data, and scheduling data).

The network interface 1423 is a communication interface for connecting the base station apparatus 1420 to a core network 1424. The controller 1421 may communicate with a core network node or another eNB via the network interface 1423. In this case, the eNB 1400, and the core network node or the other eNB may be connected to each other via a logical interface (such as an S1 interface and an X2 interface). The network interface 1423 may also be a wired communication interface or a wireless communication interface for wireless backhaul. If the network interface 1423 is a wireless communication interface, the network interface 1423 may use a higher frequency band for wireless communication than a frequency band used by the wireless communication interface 1425.

The wireless communication interface 1425 supports any cellular communication scheme (such as Long Term Evolution (LTE), LTE-Advanced (LTE-A), and New Radio technology (NR)), and provides wireless connection to a terminal positioned in a cell of the eNB 1400 via the antenna 1410. In addition, the wireless communication interface 1425 may also be, for example, a PC5 interface to support sidelink communication (for example, in a V2I communication scenario). The wireless communication interface 1425 may typically include, for example, a baseband (BB) processor 1426 and an RF circuit 1427. The BB processor 1426 may perform, for example, encoding/decoding, modulating/demodulating, and multiplexing/demultiplexing, and performs various types of signal processing of layers (such as L1, medium access control (MAC), wireless link control (RLC), and a packet data convergence protocol (PDCP)). The BB processor 1426 may have a part or all of the above-described logical functions instead of the controller 1421. The BB processor 1426 may be a memory that stores a communication control program, or a module that includes a processor and a related circuit configured to execute the program. Updating the program may allow the functions of the BB processor 1426 to be changed. The module may be a card or a blade that is inserted into a slot of the base station apparatus 1420. Alternatively, the module may also be a chip that is mounted on the card or the blade. Further, the RF circuit 1427 may include, for example, a mixer, a filter, and an amplifier, and transmits and receives wireless signals via the antenna 1410.

As shown in FIG. 22, the wireless communication interface 1425 may include multiple BB processors 1426. For example, the multiple BB processors 1426 may be compatible with multiple frequency bands used by the eNB 1400. As shown in FIG. 22, the wireless communication interface 1425 may include multiple RF circuits 1427. For example, the multiple RF circuits 1427 may be compatible with multiple antenna elements. Although FIG. 22 shows the example in which the wireless communication interface 1425 includes the multiple BB processors 1426 and the multiple RF circuits 1427, the wireless communication interface 1425 may also include a single BB processor 1426 or a single RF circuit 1427.

Second Application Example

Figure 23:
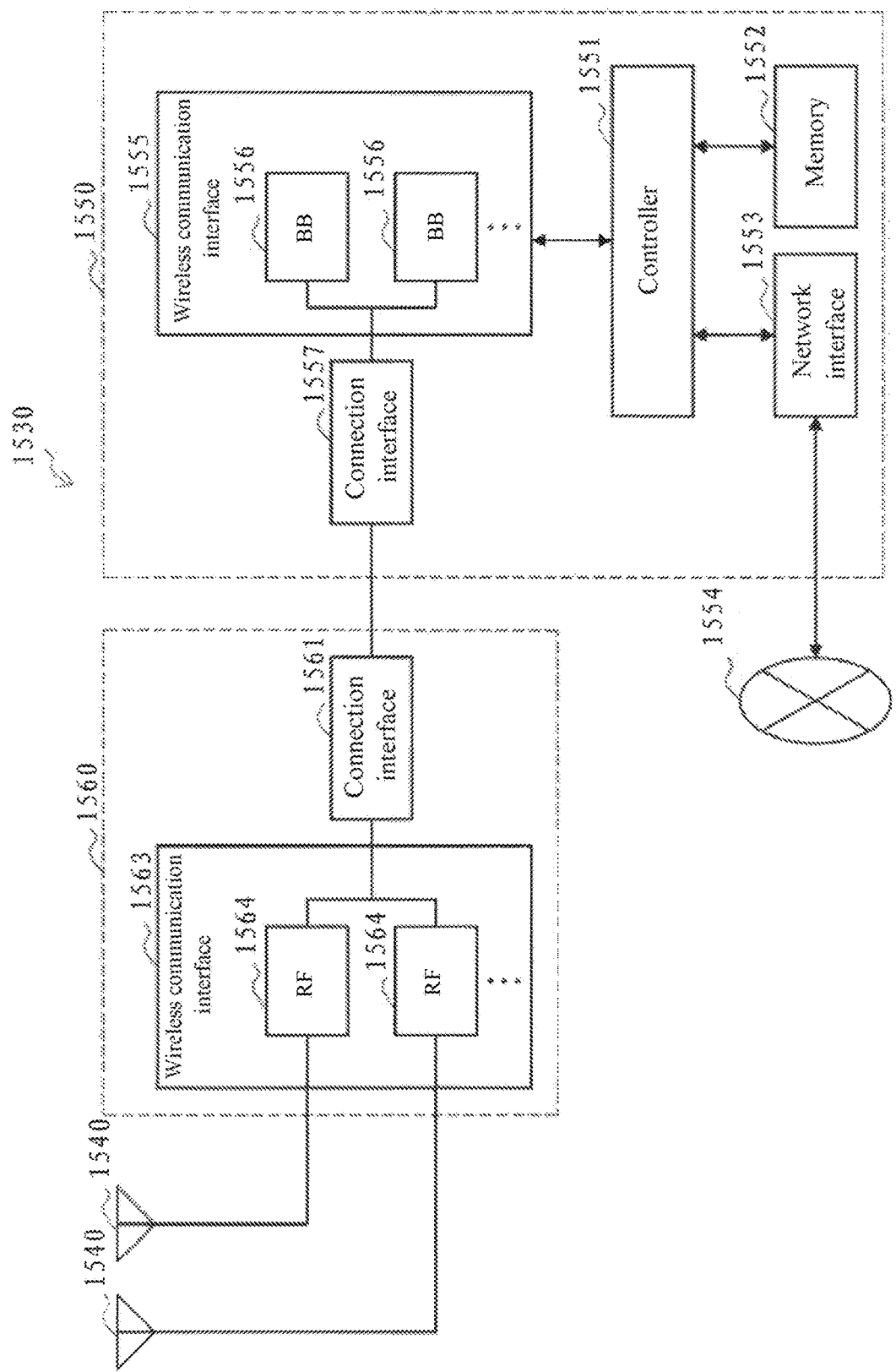
FIG. 23 is a block diagram showing a second schematic configuration example of an eNB to which the technology of the present disclosure may be applied.

FIG. 23 is a block diagram showing a second schematic configuration example of an eNB to which the technology of the present disclosure may be applied. An eNB 1530 includes one or more antennas 1540, a base station apparatus 1550, and an RRH 1560. The RRH 1560 and each antenna 1540 may be connected to each other via an RF cable. The base station apparatus 1550 and the RRH 1560 may be connected to each other via a high speed line such as an optical fiber cable.

Each of the antennas 1540 includes a single or multiple antenna elements (such as multiple antenna elements included in an MIMO antenna), and is used for the RRH 1560 to transmit and receive wireless signals. As shown in FIG. 23, the eNB 1530 may include multiple antennas 1540. For example, the multiple antennas 1540 may be compatible with multiple frequency bands used by the eNB 1530. Although FIG. 23 shows the example in which the eNB 1530 includes the multiple antennas 1540, the eNB 1530 may also include a single antenna 1540.

The base station apparatus 1550 includes a controller 1551, a memory 1552, a network interface 1553, a wireless communication interface 1555, and a connection interface 1557. The controller 1551, the memory 1552, and the network interface 1553 are the same as the controller 1421, the memory 1422, and the network interface 1423 described with reference to FIG. 22.

The wireless communication interface 1555 supports any cellular communication scheme (such as LTE, LTE-Advanced and NR), and provides wireless communication to a terminal positioned in a sector corresponding to the RRH 1560 via the RRH 1560 and the antenna 1540. In addition, the wireless communication interface 1555 may also be, for example, a PC5 interface to support sidelink communication (for example, in a V2I communication scenario). The wireless communication interface 1555 may typically include, for example, a BB processor 1556. The BB processor 1556 is the same as the BB processor 1426 described with reference to FIG. 22, except the BB processor 1556 is connected to an RF circuit 1564 of the RRH 1560 via the connection interface 1557. As shown in FIG. 23, the wireless communication interface 1555 may include multiple BB processors 1556. For example, the multiple BB processors 1556 may be compatible with multiple frequency bands used by the eNB 1530. Although FIG. 23 shows the example in which the wireless communication interface 1555 includes the multiple BB processors 1556, the wireless communication interface 1555 may also include a single BB processor 1556.

The connection interface 1557 is an interface for connecting the base station apparatus 1550 (wireless communication interface 1555) to the RRH 1560. The connection interface 1557 may also be a communication module for communication in the above-described high speed line that connects the base station apparatus 1550 (wireless communication interface 1555) to the RRH 1560.

The RRH 1560 includes a connection interface 1561 and a wireless communication interface 1563.

The connection interface 1561 is an interface for connecting the RRH 1560 (wireless communication interface 1563) to the base station apparatus 1550. The connection interface 1561 may also be a communication module for communication in the above-described high speed line.

The wireless communication interface 1563 transmits and receives wireless signals via the antenna 1540. The wireless communication interface 1563 may typically include, for example, the RF circuit 1564. The RF circuit 1564 may include, for example, a mixer, a filter, and an amplifier, and transmits and receives wireless signals via the antenna 1540. As shown in FIG. 23, the wireless communication interface 1563 may include multiple RF circuits 1564. For example, the multiple RF circuits 1564 may support multiple antenna elements. Although FIG. 23 shows the example in which the wireless communication interface 1563 includes the multiple RF circuits 1564, the wireless communication interface 1563 may also include a single RF circuit 1564.

In the eNB 1400 shown in FIG. 22 and the eNB 1530 shown in FIG. 23, the communication unit in the apparatus on the base station side may be implemented by the wireless communication interface 1425 and the wireless communication interface 1555 and/or the wireless communication interface 1563. At least a part of the functions of the apparatus on the base station side may also be implemented by the controller 1421 and the controller 1551.

7-2. Application Example on User Equipment

First Application Example

Figure 24:
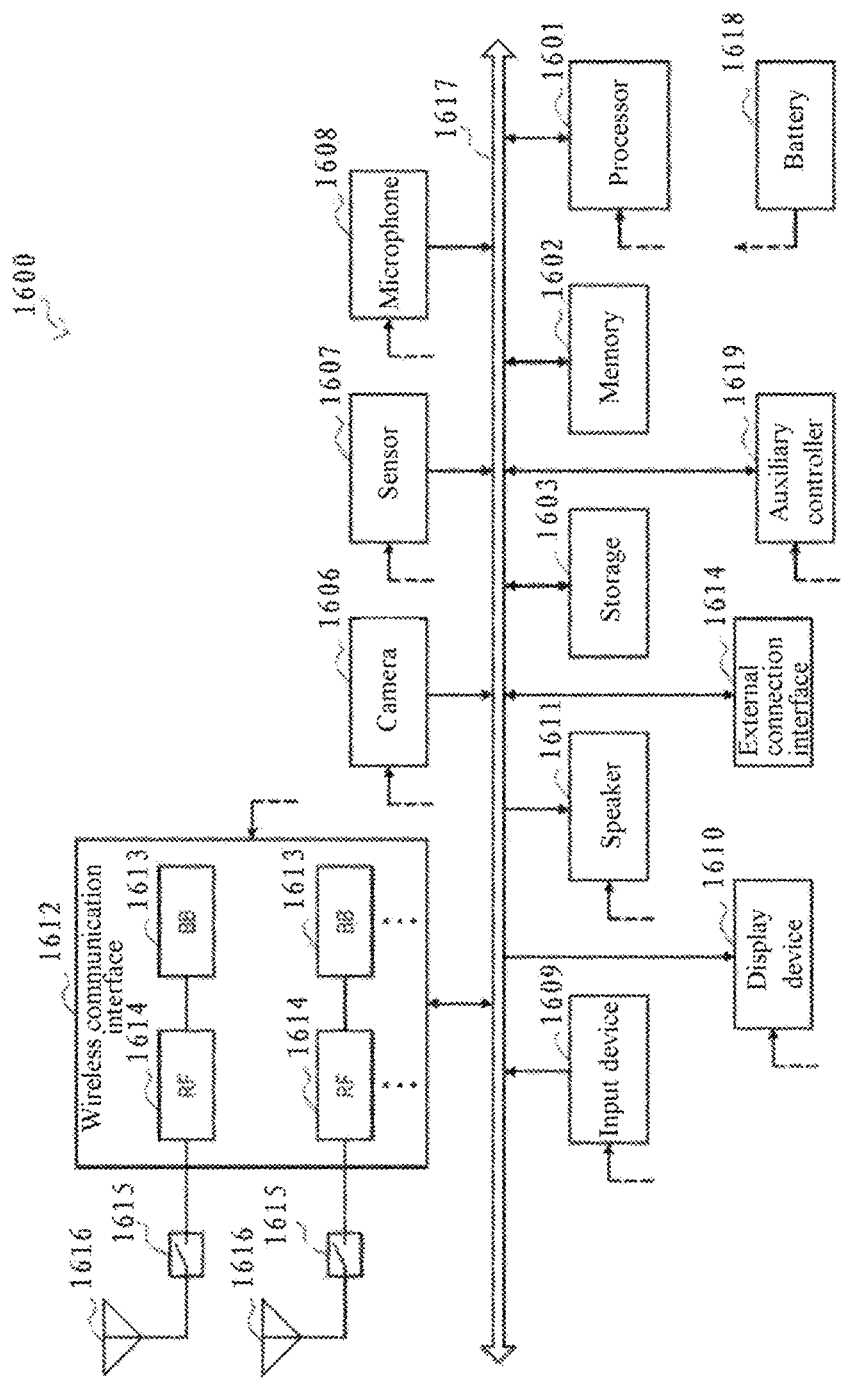
FIG. 24 is a block diagram showing a schematic configuration example of a smart phone to which the technology of the present disclosure may be applied.

FIG. 24 is a block diagram showing a schematic configuration example of a smart phone 1600 to which the technology of the present disclosure may be applied. The smart phone 1600 includes a processor 1601, a memory 1602, a storage 1603, an external connection interface 1604, a camera 1606, a sensor 1607, a microphone 1608, an input device 1609, a display device 1610, a speaker 1611, a wireless communication interface 1612, one or more antenna switches 1615, one or more antennas 1616, a bus 1617, a battery 1618, and an auxiliary controller 1619.

The processor 1601 may be, for example, a CPU or a system on a chip (SoC), and controls functions of an application layer and another layer of the smart phone 1600. The memory 1602 includes a RAM and a ROM, and stores a program executed by the processor 1601 and data. The storage 1603 may include a storage medium such as a semiconductor memory and a hard disk. The external connection interface 1604 is an interface for connecting an external device (such as a memory card and a universal serial bus (USB) device) to the smart phone 1600.

The camera 1606 includes an image sensor (such as a charge coupled device (CCD) and a complementary metal oxide semiconductor (CMOS)), and generates a captured image. The sensor 1607 may include a group of sensors such as a measurement sensor, a gyro sensor, a geomagnetic sensor, and an acceleration sensor. The microphone 1608 converts sounds that are inputted to the smart phone 1600 to audio signals. The input device 1609 includes, for example, a touch sensor configured to detect touch onto a screen of the display device 1610, a keypad, a keyboard, a button, or a switch, and receive an operation or information inputted from a user. The display device 1610 includes a screen (such as a liquid crystal display (LCD) and an organic light-emitting diode (OLED) display), and displays an output image of the smart phone 1600. The speaker 1611 converts audio signals that are outputted from the smart phone 1600 to sounds.

The wireless communication interface 1612 supports any cellular communication scheme (such as LTE, LTE-Advanced and New Radio technology (NR)), and performs wireless communication. In addition, the wireless communication interface 1612 may be, for example, a PC5 interface to support various types of sidelink communication. The wireless communication interface 1612 may typically include, for example, a BB processor 1613 and a RF circuit 1614. The BB processor 1613 may perform, for example, encoding/decoding, modulating/demodulating, and multiplexing/demultiplexing, and performs various types of signal processing for wireless communication. Further, the RF circuit 1614 may include, for example, a mixer, a filter, and an amplifier, and transmits and receives wireless signals via the antenna 1616. The wireless communication interface 1612 may be a chip module having the BB processor 1613 and the RF circuit 1614 integrated thereon. As shown in FIG. 24, the wireless communication interface 1612 may include multiple BB processors 1613 and multiple RF circuits 1614. Although FIG. 24 shows the example in which the wireless communication interface 1612 includes the multiple BB processors 1613 and the multiple RF circuits 1614, the wireless communication interface 1612 may also include a single BB processor 1613 or a single RF circuit 1614.

Furthermore, in addition to a cellular communication scheme, the wireless communication interface 1612 may support another type of wireless communication scheme such as a short-distance wireless communication scheme, a near field communication scheme, and a wireless local area network (LAN) scheme. In this case, the wireless communication interface 1612 may include the BB processor 1613 and the RF circuit 1614 for each wireless communication scheme.

Each of the antenna switches 1615 switches connection destinations of the antennas 1616 among multiple circuits (such as circuits for different wireless communication schemes) included in the wireless communication interface 1612.

Each of the antennas 1616 includes a single or multiple antenna elements (such as multiple antenna elements included in an MIMO antenna), and is used for the wireless communication interface 1612 to transmit and receive wireless signals. As shown in FIG. 24, the smart phone 1600 may include multiple antennas 1616. Although FIG. 24 shows the example in which the smart phone 1600 includes the multiple antennas 1616, the smart phone 1600 may also include a single antenna 1616.

Furthermore, the smart phone 1600 may include the antenna 1616 for each wireless communication scheme. In this case, the antenna switches 1615 may be omitted from the configuration of the smart phone 1600.

The bus 1617 connects the processor 1601, the memory 1602, the storage 1603, the external connection interface 1604, the camera 1606, the sensor 1607, the microphone 1608, the input device 1609, the display device 1610, the speaker 1611, the wireless communication interface 1612, and the auxiliary controller 1619 to each other. The battery 1618 supplies power to blocks of the smart phone 1600 shown in FIG. 24 via feeder lines that are partially shown as dashed lines in the FIG. 24. The auxiliary controller 1619 operates a minimum necessary function of the smart phone 1600, for example, in a sleep mode.

In the smart phone 1600 shown in FIG. 24, the communication unit in the apparatus on the user equipment side may be implemented by the wireless communication interface 1612. At least a part of the functions of the apparatus on the user equipment side may also be implemented by the processor 1601 or the auxiliary controller 1619.

Second Application Example

Figure 25:
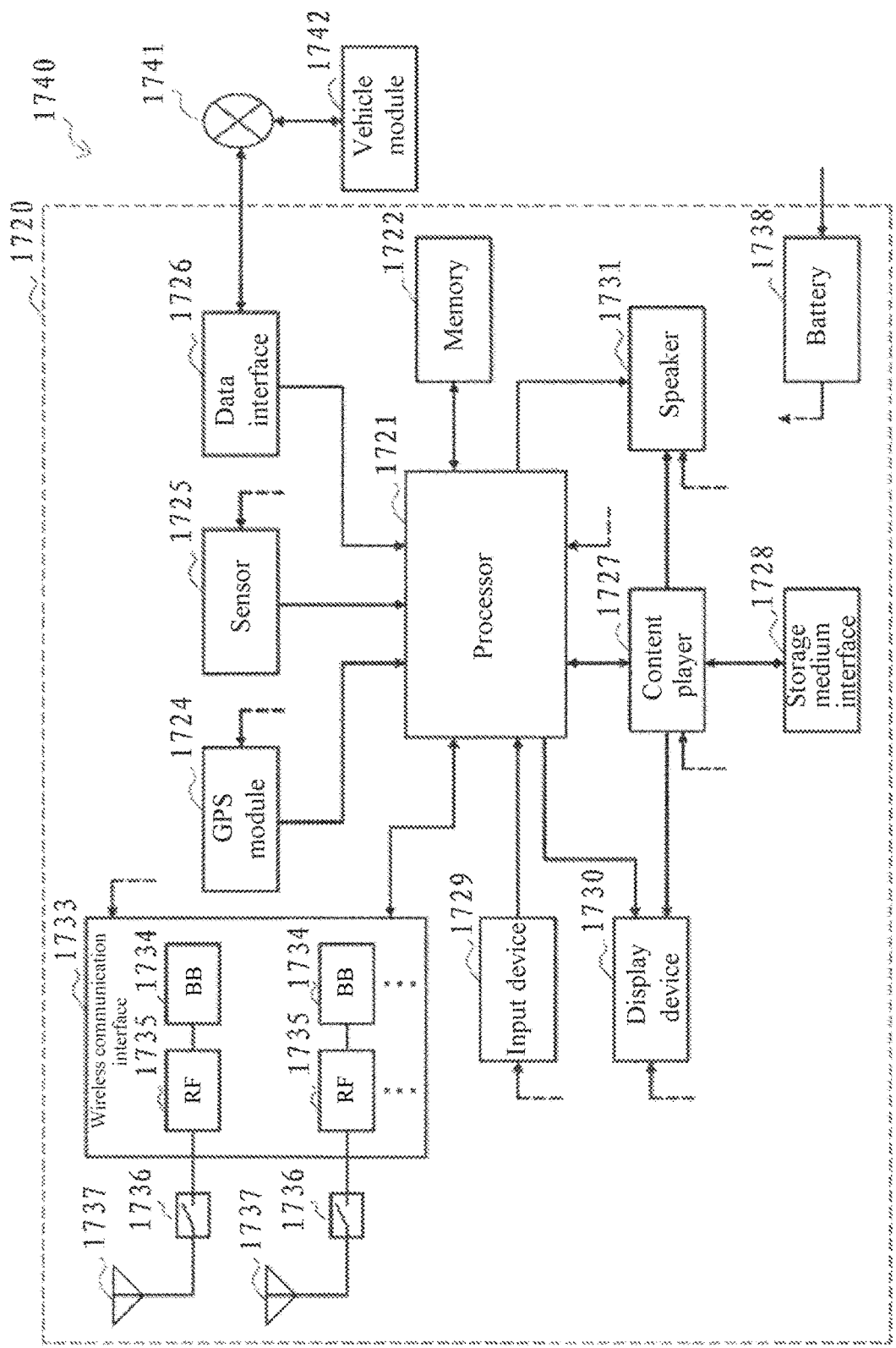
FIG. 25 is a block diagram showing a schematic configuration example of a car navigation apparatus to which the technology of the present disclosure may be applied.

FIG. 25 is a block diagram showing a schematic configuration example of a car navigation apparatus 1720 to which the technology of the present disclosure may be applied. The car navigation apparatus 1720 includes a processor 1721, a memory 1722, a global positioning system (GPS) module 1724, a sensor 1725, a data interface 1726, a content player 1727, a storage medium interface 1728, an input device 1729, a display device 1730, a speaker 1731, a wireless communication interface 1733, one or more antenna switches 1736, one or more antennas 1737, and a battery 1738.

The processor 1721 may be, for example, a CPU or a SoC, and controls a navigation function and another function of the car navigation apparatus 1720. The memory 1722 includes a RAM and a ROM, and stores a program executed by the processor 1721 and data.

The GPS module 1724 measures a position (such as latitude, longitude, and altitude) of the car navigation apparatus 1720 by using GPS signals received from a GPS satellite. The sensor 1725 may include a group of sensors such as a gyro sensor, a geomagnetic sensor, and an air pressure sensor. The data interface 1726 is connected to, for example, an in-vehicle network 1741 via a terminal that is not shown, and acquires data (such as vehicle speed data) generated by the vehicle.

The content player 1727 reproduces content stored in a storage medium (such as a CD and a DVD) that is inserted into the storage medium interface 1728. The input device 1729 includes, for example, a touch sensor configured to detect touch onto a screen of the display device 1730, a button or a switch, and receives an operation or information inputted from a user. The display device 1730 includes a screen such as a LCD or an OLED display, and displays an image of the navigation function or content that is reproduced. The speaker 1731 outputs sounds of the navigation function or the content that is reproduced.

The wireless communication interface 1733 supports any cellular communication scheme (such as LTE, LTE-Advanced and New Radio technology (NR)), and performs wireless communication. In addition, the wireless communication interface 1733 may also be, for example, a PC5 interface to support sidelink communication (for example, V2X communication). The wireless communication interface 1733 may typically include, for example, a BB processor 1734 and an RF circuit 1735. The BB processor 1734 may perform, for example, encoding/decoding, modulating/demodulating, and multiplexing/demultiplexing, and performs various types of signal processing for wireless communication. Further, the RF circuit 1735 may include, for example, a mixer, a filter, and an amplifier, and transmits and receives wireless signals via the antenna 1737. The wireless communication interface 1733 may also be a chip module having the BB processor 1734 and the RF circuit 1735 integrated thereon. As shown in FIG. 25, the wireless communication interface 1733 may include multiple BB processors 1734 and multiple RF circuits 1735. Although FIG. 25 shows the example in which the wireless communication interface 1733 includes the multiple BB processors 1734 and the multiple RF circuits 1735, the wireless communication interface 1733 may also include a single BB processor 1734 or a single RF circuit 1735.

Furthermore, in addition to the cellular communication scheme, the wireless communication interface 1733 may support another type of wireless communication scheme such as a short-distance wireless communication scheme, a near field communication scheme, and a wireless LAN scheme. In this case, the wireless communication interface 1733 may include the BB processor 1734 and the RF circuit 1735 for each wireless communication scheme.

Each of the antenna switches 1736 switches connection destinations of the antennas 1737 among multiple circuits (such as circuits for different wireless communication schemes) included in the wireless communication interface 1733.

Each of the antennas 1737 includes a single or multiple antenna elements (such as multiple antenna elements included in an MIMO antenna), and is used for the wireless communication interface 1733 to transmit and receive wireless signals. As shown in FIG. 25, the car navigation apparatus 1720 may include multiple antennas 1737. Although FIG. 25 shows the example in which the car navigation apparatus 1720 includes the multiple antennas 1737, the car navigation apparatus 1720 may also include a single antenna 1737.

Furthermore, the car navigation apparatus 1720 may include the antenna 1737 for each wireless communication scheme. In this case, the antenna switches 1736 may be omitted from the configuration of the car navigation apparatus 1720.

The battery 1738 supplies power to blocks of the car navigation apparatus 1720 shown in FIG. 25 via feeder lines that are partially shown as dashed lines in the FIG. 25. The battery 1738 accumulates power supplied form the vehicle.

In the car navigation apparatus 1720 shown in FIG. 25, the communication unit in the apparatus on the user equipment side may be implemented by the wireless communication interface 1733. At least a part of the functions of the apparatus on the user equipment side may also be implemented by the processor 1721.

The technology of the present disclosure may also be implemented as an in-vehicle system (or a vehicle) 1740 including one or more blocks of the car navigation apparatus 1720, the in-vehicle network 1741 and a vehicle module 1742. The vehicle module 1742 generates vehicle data (such as a vehicle speed, an engine speed or failure information), and outputs the generated data to the in-vehicle network 1741.

Although the preferred embodiments of the present disclosure have been described above with reference to the drawings, the present disclosure is not limited to the above examples. It should be understood that, those skilled in the art may make various changes and modifications within the scope of the appended claims, and the changes and modifications naturally fall within the technical scope of the present disclosure.

For example, multiple functions included in one unit in the above embodiments may be implemented by separate devices. Alternatively, multiple functions implemented by multiple units in the above embodiments may be implemented by separate devices, respectively. In addition, one of the above functions may be implemented by multiple units. Such a configuration is included in the technical scope of the present disclosure.

In this specification, the steps described in the flowcharts include not only the processing performed chronologically in the order described, but also the processing performed in parallel or individually but not necessarily chronologically. In addition, even in the steps processed chronologically, the order may be appropriately changed.

Although the present disclosure and the advantages thereof have been described in details, it shall be appreciated that various modifications, substitutions and variations can be made without departing from the spirit and scope of the present disclosure as defined by the appended claims. Furthermore, the terms "comprising", "including" or any other variant thereof in the embodiments of the present disclosure are intended to encompass non-exclusive inclusion, so that processes, methods, articles, or devices that include a series of elements include not only those elements, but also include other elements that are not explicitly listed, or include elements that are inherent to such processes, methods, articles, or devices. In addition, in the absence of more restrictions, the elements defined by the sentence "including a . . . " do not exclude the presence of additional same elements in the process, method, article, or device that includes the elements.

The invention claimed is:

1. An electronic device configured to operate as a first user equipment in a New Radio (NR) wireless communication system, the electronic device comprising:
    a transceiver; and
    circuitry configured to:
        acquire a default preconfiguration for sidelink communication from a base station to be used by the first user equipment when the first user equipment is not in range of the base station, wherein the default preconfiguration for sidelink communication comprises:
  one or more subcarrier spacings for sidelink communication, and
  one or more cyclic prefix types for sidelink communication;
acquire a user equipment capability of a second user equipment for sidelink communication,
wherein the user equipment capability of the second user equipment comprises:
  a cyclic prefix type of the one or more cyclic prefix types, and
  an integer corresponding to a subcarrier spacing of the one or more subcarrier spacings;
after acquiring the user equipment capability of the second user equipment, determine whether or not the first user equipment is in range of the base station;
only upon determining the first user equipment is not in range of the base station determine, based on the acquired user equipment capability of the second user equipment, a subcarrier spacing from one or more subcarrier spacings in the default preconfiguration for sidelink communication; and
perform sidelink communication with the second user equipment based on the subcarrier spacing,
wherein, based on the acquired user equipment capability of the second user equipment, the sidelink communication is performed in accordance with a default preconfiguration specific number of slots in a subframe, a default preconfiguration specific number of Orthogonal Frequency Division Multiplexed (OFDM) symbols in a slot, and a default preconfiguration specific number of slots in a frame.

2. The electronic device according to claim 1, wherein the one or more subcarrier spacings are one or more from $\Delta f=2^{\mu}\cdot 15$ [kHz] and the integer is $\mu$, $\mu=0, 1, 2, 3$.

3. The electronic device according to claim 2, wherein the circuitry is configured to determine the subcarrier spacing based on a traffic type of the sidelink communication.

4. The electronic device according to claim 3, wherein the circuitry is configured to, in case that the traffic type is LTE traffic, determine the sub carrier spacing as 15 kHz.

5. A method performed by an electronic device configured to operate as a first user equipment in a New Radio (NR) wireless communication system, the method comprising:
acquiring a default preconfiguration for sidelink communication from a base station to be used by the first user equipment when the first user equipment is not in range of the base station,
wherein the default preconfiguration for sidelink communication comprises:
  one or more subcarrier spacings for sidelink communication, and
  one or more cyclic prefix types for sidelink communication;
acquiring a user equipment capability of a second user equipment for sidelink communication,
wherein the user equipment capability of the second user equipment comprises:
  a cyclic prefix type of the one or more cyclic prefix types, and
  an integer corresponding to a subcarrier spacing of the one or more subcarrier spacings;
after acquiring the user equipment capability of the second user equipment, determining whether or not the first user equipment is in range of the base station;
only upon determining the first user equipment is not in range of the base station determining, based on the acquired user equipment capability of the second user equipment, a subcarrier spacing from one or more subcarrier spacings in the default preconfiguration for sidelink communication; and
performing sidelink communication with the second user equipment based on the subcarrier spacing,
wherein, based on the acquired user equipment capability of the second user equipment, the sidelink communication is performed in accordance with a default preconfiguration specific number of slots in a subframe, a default preconfiguration specific number of Orthogonal Frequency Division Multiplexed (OFDM) symbols in a slot, and a default preconfiguration specific number of slots in a frame.

6. The electronic device according to claim 1, wherein the user equipment capability of the second user equipment further comprises a movement speed of the second user equipment, a channel busy ratio, a channel occupancy ratio of the second user equipment and a data service priority of the sidelink communication of the second user equipment.

7. The method according to claim 5, wherein the user equipment capability of the second user equipment further comprises a movement speed of the second user equipment, a channel busy ratio, a channel occupancy ratio of the second user equipment and a data service priority of the sidelink communication of the second user equipment.

\* \* \* \* \*